United States Patent
Toizumi et al.

(10) Patent No.: US 12,108,167 B2
(45) Date of Patent: Oct. 1, 2024

(54) OPTIMIZING SENSING PARAMETER IN IMAGING DEVICE USING SCORES

(71) Applicant: NEC Corporation, Tokyo (JP)

(72) Inventors: Takahiro Toizumi, Tokyo (JP); Chisato Funayama, Tokyo (JP); Masato Tsukada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 187 days.

(21) Appl. No.: 17/640,520

(22) PCT Filed: Jan. 21, 2021

(86) PCT No.: PCT/JP2021/002043
§ 371 (c)(1),
(2) Date: Mar. 4, 2022

(87) PCT Pub. No.: WO2022/157886
PCT Pub. Date: Jul. 28, 2022

(65) Prior Publication Data
US 2023/0156348 A1    May 18, 2023

(51) Int. Cl.
*H04N 23/82* (2023.01)
*G06T 7/00* (2017.01)

(52) U.S. Cl.
CPC ........... *H04N 23/82* (2023.01); *G06T 7/0002* (2013.01); *G06T 2207/10152* (2013.01); *G06T 2207/30168* (2013.01)

(58) Field of Classification Search
CPC ........ H04N 23/82; H04N 23/71; H04N 23/60; G06T 7/0002; G06T 2207/10152; G06T 2207/30168; G06T 7/80
See application file for complete search history.

(56) References Cited

U.S. PATENT DOCUMENTS

| | | | |
|---|---|---|---|
| 2015/0363670 A1 | 12/2015 | Sugishita et al. | |
| 2017/0140789 A1* | 5/2017 | Onozawa | G06V 20/46 |
| 2018/0165538 A1* | 6/2018 | Iguchi | G06T 7/73 |
| 2018/0350106 A1* | 12/2018 | Kasilya Sudarsan | H04N 23/633 |
| 2019/0005356 A1* | 1/2019 | Tsunoda | G06V 10/776 |

(Continued)

FOREIGN PATENT DOCUMENTS

| | | |
|---|---|---|
| JP | 2010-026591 A | 2/2010 |
| JP | 2016-015116 A | 1/2016 |

(Continued)

OTHER PUBLICATIONS

International Search Report for PCT Application No. PCT/JP2021/002043, mailed on Mar. 30, 2021.

*Primary Examiner* — Padma Haliyur

(57) ABSTRACT

A parameter optimization system (10) includes: an image sensor (110) having at least one sensing parameter; a parameter setting unit (120) configured to be able to change the sensing parameter; a score calculation unit (130) configured to calculate a score from an image acquired by the image sensor; and a parameter determination unit (140) configured to determine a right parameter value that is a value of the sensing parameter at which the score is relatively high, based on a value of the sensing parameter and the score corresponding to the value of the sensing parameter. According to such a parameter optimization system, the sensing parameter of the image sensor can be set to an appropriate value.

8 Claims, 20 Drawing Sheets

(56) References Cited

U.S. PATENT DOCUMENTS

| | | | |
|---|---|---|---|
| 2020/0014856 A1 | 1/2020 | Oka et al. | |
| 2020/0137281 A1* | 4/2020 | Omori | H04N 23/611 |
| 2020/0342224 A1* | 10/2020 | Chihara | G06V 10/751 |
| 2020/0364498 A1* | 11/2020 | Trifol | G06N 3/08 |
| 2020/0372682 A1* | 11/2020 | Kim | G06N 3/08 |
| 2021/0247324 A1 | 8/2021 | Naruse | |
| 2022/0020131 A1* | 1/2022 | Metzler | G06T 5/50 |

FOREIGN PATENT DOCUMENTS

| | | |
|---|---|---|
| JP | 2019-012426 A | 1/2019 |
| JP | 2020-010166 A | 1/2020 |
| JP | 2020-077326 A | 5/2020 |
| WO | 2019/136827 A1 | 7/2019 |

\* cited by examiner

| ANALOG PARAMETER | DIGITAL PARAMETER |
|---|---|
| •EXPOSURE TIME<br>•ANALOG GAIN<br>•F NUMBER<br> (APERTURE VALUE)<br>•FOCAL LENGTH<br> (FIELD OF VIEW)<br>•FLASH<br>•OTHER | •WHITE BALANCE<br>•BRIGHTNESS<br>•DIGITAL GAIN<br>•DENOISING<br>•OTHER |

FIG. 5

OPTIMIZING SENSING PARAMETER IN IMAGING DEVICE USING SCORES

This application is a National Stage Entry of PCT/JP2021/002043 filed on Jan. 21, 2021, the contents of all of which are incorporated herein by reference, in their entirety.

TECHNICAL FIELD

The present disclosure relates to a technical field of a parameter optimization system, a parameter optimization method, and a computer program that optimize a parameter of an image sensor.

BACKGROUND ART

As a system of this type, there is known a system that adjusts various parameters related to image pickup. For example, Patent Reference 1 discloses a technique in which an estimated image of a target object is generated based on an image dataset obtained by associating captured images with lighting parameters, and the lighting parameters are optimized through machine learning using the estimated image. Patent Reference 2 discloses a technique that optimizes an imaging parameter estimator by performing regression learning using, for teacher values, imaging parameters that maximize a category determination score. Patent Reference 3 discloses a technique in which, from a parameter table updated by using a predetermined learning algorithm, a recognition control parameter corresponding to an image pickup environment where a camera device is installed is selected and used.

CITATION LIST

Patent Literature

Patent Reference 1
  Japanese Patent Laid-Open No. 2020-077326 A
Patent Reference 2
  Japanese Patent Laid-Open No. 2019-012426 A
Patent Reference 3
  Japanese Patent Laid-Open No. 2016-015116 A

SUMMARY

Technical Problem

The present disclosure improves the related techniques described above.

Solution to Problem

A parameter optimization system according to an example aspect of the present invention includes: an image sensor having at least one sensing parameter; a parameter setting unit configured to be able to change the sensing parameter; a score calculation unit configured to calculate a score from an image acquired by the image sensor; and a parameter determination unit configured to determine a right parameter value that is a value of the sensing parameter at which the score is relatively high, based on a value of the sensing parameter and the score corresponding to the value of the sensing parameter.

A parameter optimization method in a parameter optimization system for an image sensor having at least one sensing parameter that can be changed, the parameter optimization method according to an example aspect of the present invention includes: calculating a score from an image acquired by the image sensor; and determining a right parameter value that is a value of the sensing parameter at which the score is relatively high, based on a value of the sensing parameter and the score corresponding to the value of the sensing parameter.

A computer program according to an example aspect of the present invention causing a computer to operate as a parameter optimization system for an image sensor having at least one sensing parameter that can be changed, and operate such as to: calculate a score from an image acquired by the image sensor; and determine a right parameter value that is a value of the sensing parameter at which the score is relatively high, based on a value of the sensing parameter and the score corresponding to the value of the sensing parameter.

BRIEF DESCRIPTION OF DRAWINGS

FIG. 5 is a table showing examples of sensing parameters handled in the parameter optimization system according to the second embodiment.

DESCRIPTION OF EXAMPLE EMBODIMENTS

Hereinafter, embodiments of a parameter optimization system, a parameter optimization method, and a computer program will be described with reference to drawings.

First Embodiment

A parameter optimization system according to a first embodiment is described with reference to FIGS. 1 to 3.
(Hardware Configuration)

First, a hardware configuration of the parameter optimization system according to the first embodiment is described with reference to FIG. 1. FIG. 1 is a block diagram showing the hardware configuration of the parameter optimization system according to the first embodiment.

Figure 1:
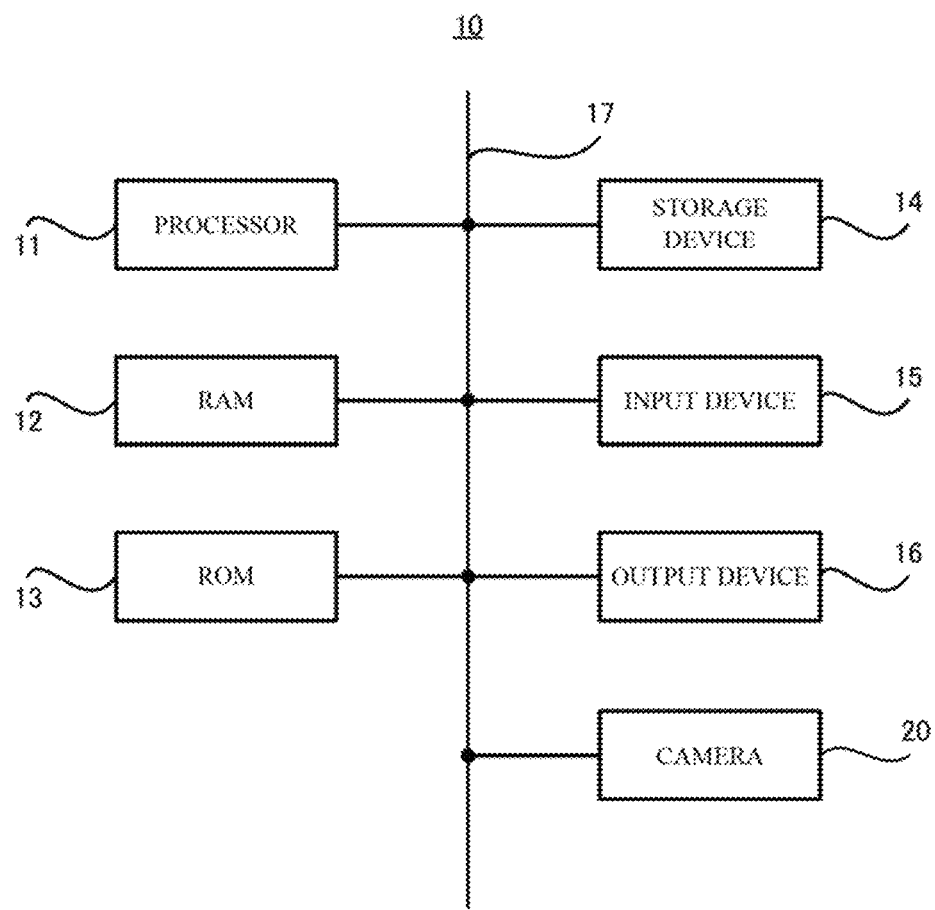
FIG. 1 is a block diagram showing a hardware configuration of a parameter optimization system according to a first embodiment.

As shown in FIG. 1, the parameter optimization system 10 according to the first embodiment includes a processor 11, a RAM (Random Access Memory) 12, a ROM (Read Only Memory) 13, and a storage device 14. The parameter optimization system 10 may include an input device 15 and an output device 16. The parameter optimization system 10 further includes a camera 20. The processor 11, the RAM 12, the ROM 13, the storage device 14, the input device 15, the output device 16, and the camera 20 are connected to each other through a data bus 17.

The processor 11 reads a computer program. For example, the processor 11 is configured to read the computer program stored in at least one of the RAM 12, the ROM 13, and the storage device 14. Alternatively, the processor 11 may read the computer program stored in a computer-readable recording medium, by using an undepicted recording media reader. The processor 11 may acquire (that is, may read) the computer program, via a network interface, from an undepicted device disposed outside of the parameter optimization system 10. The processor 11 controls the RAM 12, the storage device 14, the input device 15, and the output device 16 by executing the read computer program. In the present embodiment in particular, when the processor 11 executes the read computer program, a functional block for optimizing a sensing parameter of an image sensor is implemented in the processor 11. Examples of the processor 11 include CPU (Central Processing Unit), GPU (Graphics Processing Unit), FPGA (field-programmable gate array), DSP (Demand-Side platform), and ASIC (Application Specific Integrated Circuit). The processor 11 may use one of the examples mentioned above, or may use two or more thereof in parallel.

The RAM 12 transitorily stores the computer program to be executed by the processor 11. The RAM 12 transitorily stores data transitorily used by the processor 11 when the processor 11 executes the computer program. The RAM 12 may be, for example, a D-RAM (Dynamic RAM).

The ROM 13 stores the computer program to be executed by the processor 11. The ROM 13 may store other fixed data. The ROM 13 may be, for example, a P-ROM (Programmable ROM).

The storage device 14 stores data that the parameter optimization system 10 retains for a long time. The storage device 14 may operate as a transitory storage device for the processor 11. The storage device 14 may include at least one of, for example, a hard disk device, a magneto-optical device, an SSD (Solid State Drive), and a disk array device.

The input device 15 is a device that receives an input instruction from a user of the parameter optimization system 10. The input device 15 may include at least one of, for example, a keyboard, a mouse, and a touch panel. The input device 15 may be a dedicated controller (operation terminal). The input device 15 may include a terminal (for example, a smartphone, a tablet terminal, or the like) owned by the user. The input device 15 may be, for example, a device that includes a microphone and can receive voice inputs.

The output device 16 is a device that outputs information related to the parameter optimization system 10 to the outside. For example, the output device 16 may be a display device (for example, a display) capable of displaying the information related to the parameter optimization system 10. The display device here may be a TV monitor, a PC monitor, a monitor on a smartphone, a monitor on a tablet terminal, or a monitor on any other mobile terminal. The display device may be a large-sized monitor, a digital signage, or the like installed in various facilities such as stores. The output device 16 may be a device that outputs information in a form other than image. For example, the output device 16 may be a speaker that outputs the information related to the parameter optimization system 10 via voice.

The camera 20 is configured as a device capable of picking up an image. The camera 20 may be a visible-light camera, or may be a camera that picks up an image by using light other than the visible light, such as infrared camera. The camera 20 may be a camera that picks up still images, or may be a camera that picks up moving images. The camera 20 includes an image sensor that has a sensing parameter. Details of the image sensor will be described later.
(Functional Configuration)

Next, a functional configuration of the parameter optimization system 10 according to the first embodiment is described with reference to FIG. 2. FIG. 2 is a block diagram showing the functional configuration of the parameter optimization system according to the first embodiment.

Figure 2:
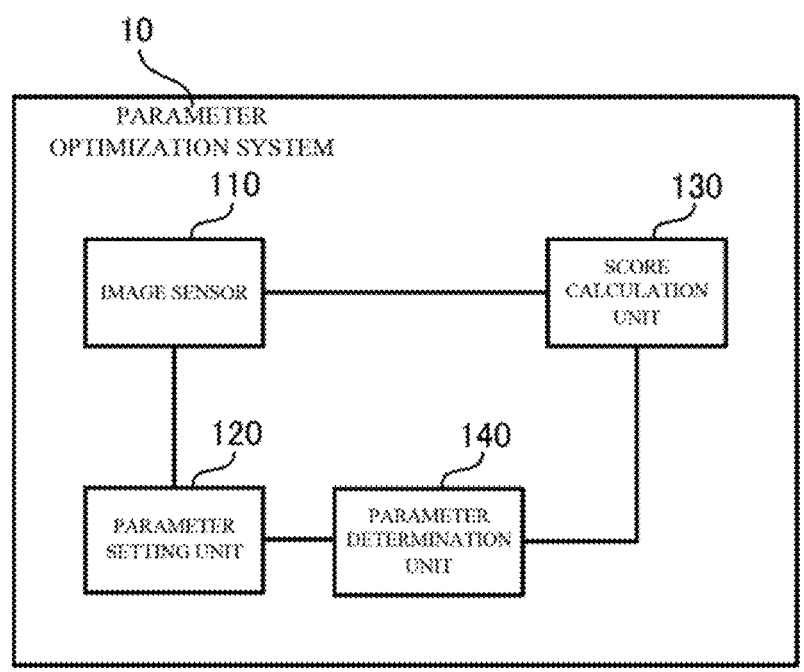
FIG. 2 is a block diagram showing a functional configuration of the parameter optimization system according to the first embodiment.

As shown in FIG. 2, the parameter optimization system 10 according to the first embodiment includes, as constitutional elements for implementing functions of the parameter optimization system 10, an image sensor 110, a parameter setting unit 120, a score calculation unit 130, and a parameter determination unit 140. The image sensor 110 is a sensor included in the above-described camera 20 (see FIG. 1). Each of the parameter setting unit 120, the score calculation unit 130, and the parameter determination unit 140 may be implemented by the above-described processor 11 (see FIG. 1).

The image sensor 110 is configured as a sensor capable of acquiring an image. Although a specific configuration of the image sensor 110 is not particularly limited, the image sensor 110 may be configured as, for example, CCD (Charge Coupled Devices), or CMOS (Complementary Metal Oxide Semiconductor). The image sensor 110 has at least one sensing parameter (that is, a parameter related to image pickup). Specific examples of the sensing parameter are described in detail in another embodiment, which will be described later.

The parameter setting unit 120 is configured to be able to set (that is, change) the sensing parameter of the image sensor 110. When the image sensor 110 has a plurality of sensing parameters, the parameter setting unit 120 may be able to collectively set the sensing parameters, or may be able to individually set the sensing parameters one by one. The parameter setting unit 120 is configured to be able to output information related to a current setting of the sensing parameter to the parameter determination unit 140.

The score calculation unit 130 is configured to be able to calculate a score from an image acquired by the image sensor 110. The "score" here is a quantified state of the image. For example, the score may be a value indicating quality of the image, or may be a value indicating a result of detecting or a result of recognizing an image-pickup target in the image. More specifically, the score may be a face recognition score indicating a degree of matching (degree of similarity) of a face in face recognition. A detailed description of a specific method of calculating the score is omitted because an existing technique can be adopted as appropriate. A configuration is made such that the score calculated by the score calculation unit 130 is outputted to the parameter determination unit 140.

The parameter determination unit 140 is configured to be able to determine a right parameter value at which the score becomes relatively high, by using information related to the sensing parameter acquired from the parameter setting unit 120, and information related to the score calculated by the score calculation unit 130. A specific method of determining the right parameter value is described in detail in other embodiments, which will be described later. The right parameter value may be such a value of the sensing parameter that maximizes the score of an image in a current shooting environment. Alternatively, the right parameter value may be such a value of the sensing parameter that makes the score of an image higher than a predetermined threshold value. When the image sensor 110 has a plurality of sensing parameters, the parameter determination unit 140 may determine right parameter values for all of the sensing parameters, or may determine a right parameter value or right parameter values for one or some of the sensing parameters.

(Flow of Operation)

Next, a flow of operation of the parameter optimization system 10 according to the first embodiment is described with reference to FIG. 3. FIG. 3 is a flowchart showing the flow of the operation of the parameter optimization system according to the first embodiment.

Figure 3:
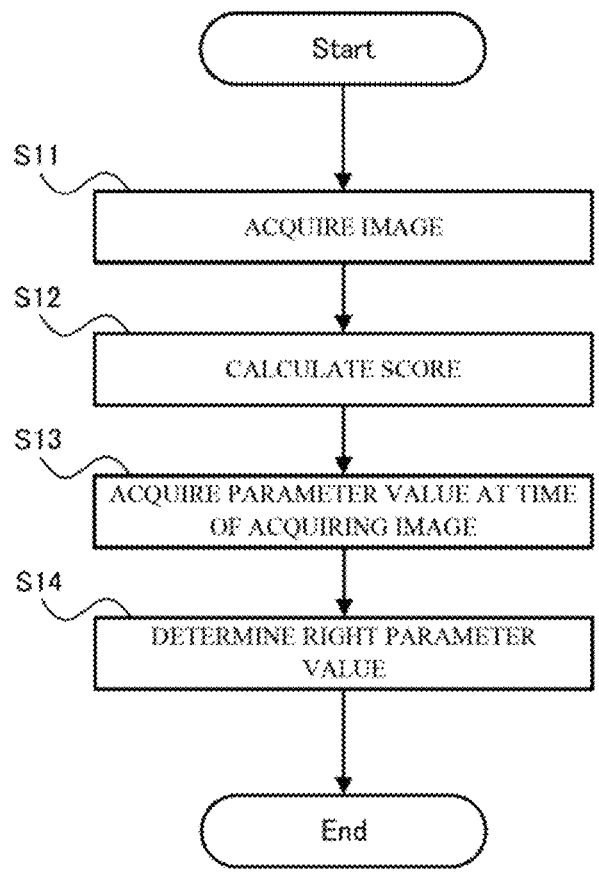
FIG. 3 is a flowchart showing a flow of operation of the parameter optimization system according to the first embodiment.

As shown in FIG. 3, when the parameter optimization system 10 according to the first embodiment starts operation, first, the image sensor 110 acquires an image (step S11).

Subsequently, the score calculation unit 130 calculates a score from the image acquired by the image sensor 110 (step S12). The score calculated by the score calculation unit 130 is outputted to the parameter determination unit 140. The parameter determination unit 140 acquires, from the parameter setting unit 120, information related to the sensing parameter at the time of picking up the image from which the score is calculated (step S13).

Subsequently, the parameter determination unit 140 determines a right parameter value, based on the score and the information related to the sensing parameter corresponding to the score (step S14). A method of using the right parameter value determined here is described in detail in the other embodiments described later.

(Technical Effects)

Next, technical effects achieved by the parameter optimization system 10 according to the first embodiment are described.

As described in FIGS. 1 to 3, in the parameter optimization system 10 according to the first embodiment, a right parameter value is determined based on the sensing parameter of the image sensor 110 and a score calculated from an image. With the configuration thus made, the sensing parameter can be appropriately set, and an image with a high score can be picked up. Accordingly, even if an initial value of the sensing parameter is an improper value for score calculation (for example, a value set to pick up an image that is easily visible to the human eye), an appropriate image for score calculation can be picked up by resetting the sensing parameter. Moreover, an appropriate image can also be picked up, irrespective of an environment (particularly, a lighting environment) when the image is picked up.

Second Embodiment

A parameter optimization system 10 according to a second embodiment is described with reference to FIGS. 4 and 5. Note that the second embodiment is different from the above-described first embodiment only in part of the configuration, and, for example, a hardware configuration and a flow of entire operation may be similar to those of the first embodiment (see FIGS. 1 and 3). Accordingly, in the following, the part different from the first embodiment is described in detail, and a description of other overlapping part is omitted as appropriate.

(Functional Configuration)

First, a functional configuration of the parameter optimization system 10 according to the second embodiment is described with reference to FIG. 4. FIG. 4 is a block diagram showing the functional configuration of the parameter optimization system according to the second embodiment. Note that in FIG. 4, elements similar to the constitutional elements shown in FIG. 2 are denoted by the same reference numbers as in FIG. 2.

Figure 4:
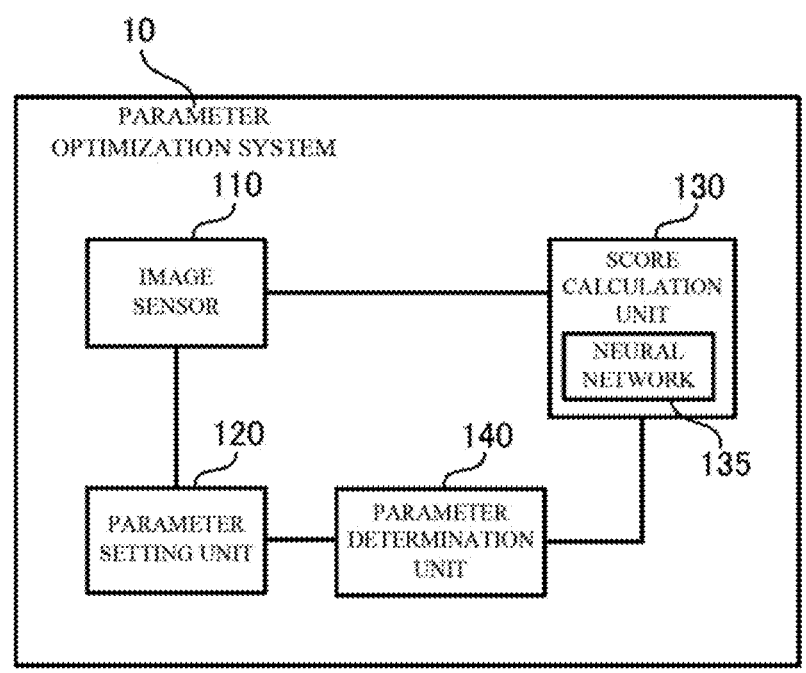
FIG. 4 is a block diagram showing a functional configuration of a parameter optimization system according to a second embodiment.

As shown in FIG. 4, the parameter optimization system 10 according to the second embodiment includes, as constitutional elements for implementing functions of the parameter optimization system 10, an image sensor 110, a parameter setting unit 120, a score calculation unit 130, and a parameter determination unit 140. The score calculation unit 130 according to the second embodiment in particular includes a neural network 135.

The neural network 135 is configured as a trained model that calculates a score from an image. The neural network 135 may be, for example, CNN (Convolution Neural Network), RNN (Recurrent Neural Network), LSTM (Long Short Term Memory), Transformer, or GAN (Generative Adversarial Network). The neural network 135 may be configured as a face recognition model that performs face recognition using a face image. Alternatively, the neural network 135 may be configured as an object recognition model that recognizes an object existing in an image.

(Sensing Parameters)

Next, sensing parameters handled in the parameter optimization system according to the second embodiment are described with reference to FIG. 5. FIG. 5 is a table showing examples of the sensing parameters handled in the parameter optimization system according to the second embodiment.

The sensing parameters shown in FIG. 5 are parameters related to set values of an image pickup device, and are parameters for which gradients cannot be calculated by error backpropagation in the neural network. The parameter optimization system according to the second embodiment determines right parameter values for such sensing parameters. Specifically, such parameters include exposure time, analog gain, F number (aperture value), focal length (field of view), flash, and the like that are analog parameters. Moreover, such parameters include white balance, brightness, digital gain, denoising, and the like that are digital parameters. Note that the parameters listed here are examples, and any other sensing parameter may be included as long as the sensing parameter is a parameter for which a gradient cannot be calculated by error backpropagation in the neural network.

(Technical Effects)

Next, technical effects achieved by the parameter optimization system 10 according to the second embodiment are described.

As described in FIGS. 4 and 5, in the parameter optimization system 10 according to the second embodiment, a right parameter value is determined for a parameter for which a gradient cannot be calculated by error backpropagation in the neural network. In such a case, even if a neural network is provided, a right parameter value cannot be determined by using the neural network. However, in the parameter optimization system 10 according to the second embodiment, a right parameter value is determined based on a value of a sensing parameter of the image sensor 110 and a score calculated from an image, as described already. Accordingly, a right parameter value can be determined without using the neural network. In other words, a right parameter value can be appropriately determined also for a parameter for which a gradient cannot be calculated by error backpropagation in the neural network.

Third Embodiment

A parameter optimization system 10 according to a third embodiment is described with reference to FIGS. 6 and 7. Note that the third embodiment is different from the above-described first and second embodiments only in part of the configuration and operation, and other part may be similar to those of the first and second embodiments. Accordingly, in the following, the part different from each embodiment described already is described in detail, and a description of other overlapping part is omitted as appropriate.

(Functional Configuration)

First, a functional configuration of the parameter optimization system 10 according to the third embodiment is described with reference to FIG. 6. FIG. 6 is a block diagram showing the functional configuration of the parameter optimization system according to the third embodiment. Note that in FIG. 6, elements similar to the constitutional elements shown in FIG. 2 are denoted by the same reference numbers as in FIG. 2.

Figure 6:
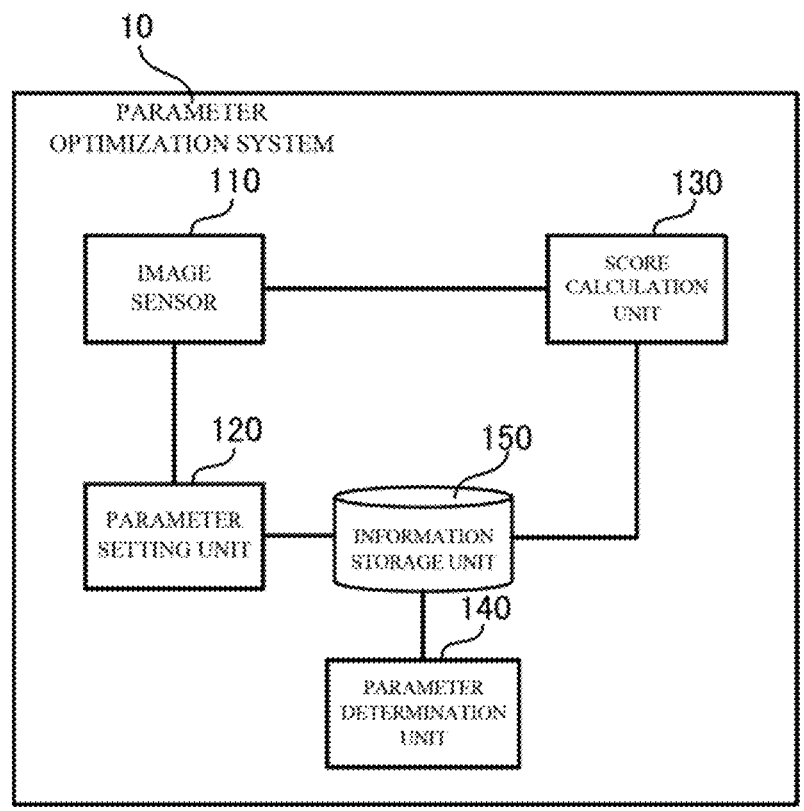
FIG. 6 is a block diagram showing a functional configuration of a parameter optimization system according to a third embodiment.

As shown in FIG. 6, the parameter optimization system 10 according to the third embodiment includes, as constitutional elements for implementing functions of the parameter optimization system 10, an image sensor 110, a parameter setting unit 120, a score calculation unit 130, a parameter determination unit 140, and an information storage unit 150. In other words, the parameter optimization system 10 according to the third embodiment further includes the information storage unit 150, in addition to the constitutional elements in the first embodiment (see FIG. 2). Note that the information storage unit 150 may be implemented by, for example, the above-described storage device 14 (see FIG. 1).

The information storage unit 150 is configured to be able to store a pair of a score calculated by the score calculation unit 130 and information related to a sensing parameter acquired from the parameter setting unit 120 (hereinafter, referred to as "pair information" as appropriate). The information storage unit 150 stores pair information each time a new image is acquired and a score is calculated. Accordingly, in the information storage unit 150, a plurality of pairs of pair information are accumulated. The pair information stored in the information storage unit 150 is configured to be able to be read by the parameter determination unit 140 when necessary.

(Flow of Operation)

Next, a flow of operation of the parameter optimization system 10 according to the third embodiment is described with reference to FIG. 7. FIG. 7 is a flowchart showing the flow of the operation of the parameter optimization system according to the third embodiment. Note that in FIG. 7, processes similar to the processes shown in FIG. 3 are denoted by the same reference numbers as in FIG. 3.

Figure 7:
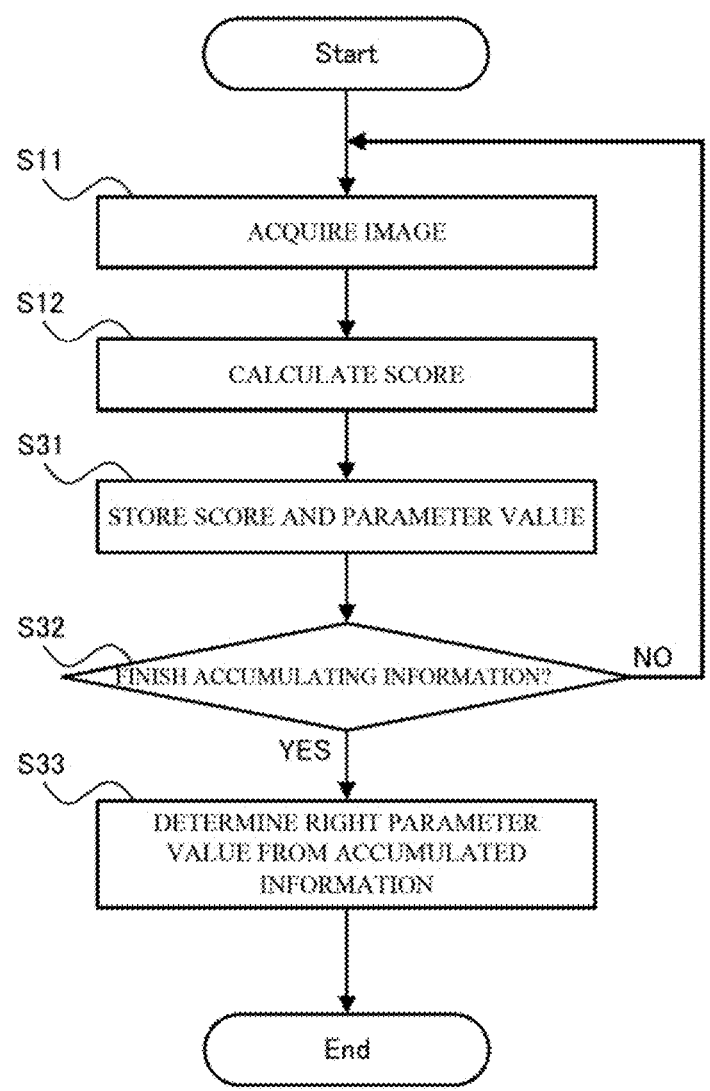
FIG. 7 is a flowchart showing a flow of operation of the parameter optimization system according to the third embodiment.

As shown in FIG. 7, when the parameter optimization system 10 according to the third embodiment starts operation, first, the image sensor 110 acquires an image (step S11). The score calculation unit 130 calculates a score from the image acquired by the image sensor 110 (step S12).

Subsequently, the information storage unit 150 stores a pair of the score calculated by the score calculation unit 130 and information related to the sensing parameter acquired from the parameter setting unit 120 (that is, pair information) (step S31).

Thereafter, the parameter optimization system 10 determines whether or not to finish accumulating pair information (step S32). It may be determined whether or not to finish accumulating pair information, for example, based on whether or not the number of accumulated pairs of pair information reaches a predetermined value The "predetermined value" in such a case may be a value preset through preliminary simulation or the like, as a sufficient number of pairs of pair information to determine a right parameter value in step S33, which will be described later. Alternatively, it may be determined whether or not to finish accumulating pair information, based on whether or not pair information corresponding to all prepared images is accumulated.

When it is determined not to finish accumulating pair information (step S32: NO), the parameter optimization system 10 according to the third embodiment repeats the processes from step S11. Thus, pair information is accumulated in the information storage unit 150. When it is determined to finish accumulating pair information (step S32: YES), the parameter determination unit 140 determines a right parameter value, based on the pair information accumulated in the information storage unit 150 (step S33).

Note that the above-described series of processes is performed beforehand, typically prior to actual operation of a system using the image sensor 110 (that is, execution of a process using a score, such as face recognition). The right parameter value determined by the parameter determination unit 140 may be reflected by the parameter setting unit 120 immediately after determined. In other words, when the right parameter value is determined, the sensing parameter of the image sensor 110 may be changed to the right parameter value. Alternatively, the right parameter value determined by the parameter determination unit 140 may be reflected by the parameter setting unit 120 at a time of the actual operation mentioned above. In other words, the determined right parameter value may be reflected in the sensing parameter of the image sensor 110 when necessary, without being immediately reflected.
(Technical Effects)

Next, technical effects achieved by the parameter optimization system 10 according to the third embodiment are described.

As described in FIGS. 6 and 7, in the parameter optimization system 10 according to the third embodiment, a right parameter value is determined based on pair information accumulated in the information storage unit 150. With the configuration thus made, since a right parameter value can be determined by using a plurality of pairs of pair information (that is, a plurality of scores and a plurality of values of the sensing parameter) accumulated in the information storage unit 150, the right parameter value can be determined as a more appropriate value than in cases where a right parameter value is determined from less information.

Fourth Embodiment

A parameter optimization system 10 according to a fourth embodiment is described with reference to FIGS. 8 and 9. Note that the fourth embodiment is different from the above-described first to third embodiments only in part of the configuration and operation, and other part may be similar to those of the first to third embodiments. Accordingly, in the following, the part different from each embodiment described already is described in detail, and a description of other overlapping part is omitted as appropriate.
(Functional Configuration)

First, a functional configuration of the parameter optimization system 10 according to the fourth embodiment is described with reference to FIG. 8. FIG. 8 is a block diagram showing the functional configuration of the parameter optimization system according to the fourth embodiment. Note that in FIG. 8, elements similar to the constitutional elements shown in FIG. 2 are denoted by the same reference numbers as in FIG. 2.

Figure 8:
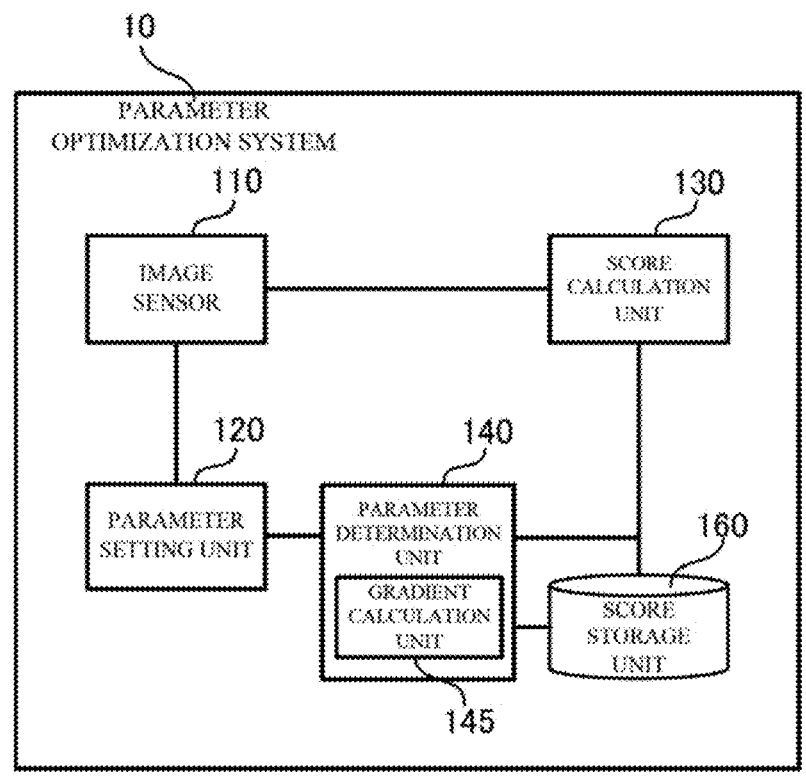
FIG. 8 is a block diagram showing a functional configuration of a parameter optimization system according to a fourth embodiment.

As shown in FIG. 8, the parameter optimization system 10 according to the fourth embodiment includes, as constitutional elements for implementing functions of the parameter optimization system 10, an image sensor 110, a parameter setting unit 120, a score calculation unit 130, a parameter determination unit 140, and a score storage unit 160. In other words, the parameter optimization system 10 according to the fourth embodiment further includes the score storage unit 160, in addition to the constitutional elements in the first embodiment (see FIG. 2). Note that the score storage unit 160 may be implemented by, for example, the above-described storage device 14 (see FIG. 1). Moreover, the parameter determination unit 140 according to the fourth embodiment includes a gradient calculation unit 145.

The score storage unit 160 is configured to be able to store a score calculated by the score calculation unit 130 and a value of a sensing parameter (hereinafter, simply referred to as a "parameter value" in some cases) at a time of picking up an image from which the score is calculated. In the parameter optimization system 10 according to the fourth embodiment, since images are acquired by the image sensor 100 sequentially (for example, in real time), a score is calculated by the score calculation unit 130 each time a new image is acquired. The score storage unit 160 accumulates thus sequentially calculated scores and parameter values.

However, the score storage unit 160 may be configured to be able to store only two consecutively calculated scores and two parameter values. In other words, the score storage unit 160 may be able to store at least two scores and two parameter values. Moreover, the score storage unit 160 may include a function of deleting a score and a parameter value that no longer need to be stored, as appropriate. The score and the parameter value stored in the score storage unit 160 are configured to be able to be read by the parameter determination unit 140 (more specifically, the gradient calculation unit 145) when necessary.

The gradient calculation unit 145 is configured to be able to calculate a parameter gradient from a plurality of scores and parameter values stored in the score storage unit 160. The gradient calculation unit 145 may calculate the parameter gradient by calculating differences between the plurality of scores and between the plurality of parameter values, and dividing the score difference by an amount of change in the parameter values. The gradient calculation unit 145 may calculate the parameter gradient from two scores and two parameter values, or may calculate the parameter gradient from three or more scores and three or more parameter values. The parameter gradient calculated by the gradient calculation unit 145 is used in determination of a right parameter value by the parameter determination unit 140.
(Flow of Operation)

Next, a flow of operation of the parameter optimization system 10 according to the fourth embodiment is described with reference to FIG. 9. FIG. 9 is a flowchart showing the flow of the operation of the parameter optimization system according to the fourth embodiment. Note that in FIG. 9, processes similar to the processes shown in FIG. 3 are denoted by the same reference numbers as in FIG. 3.

Figure 9:
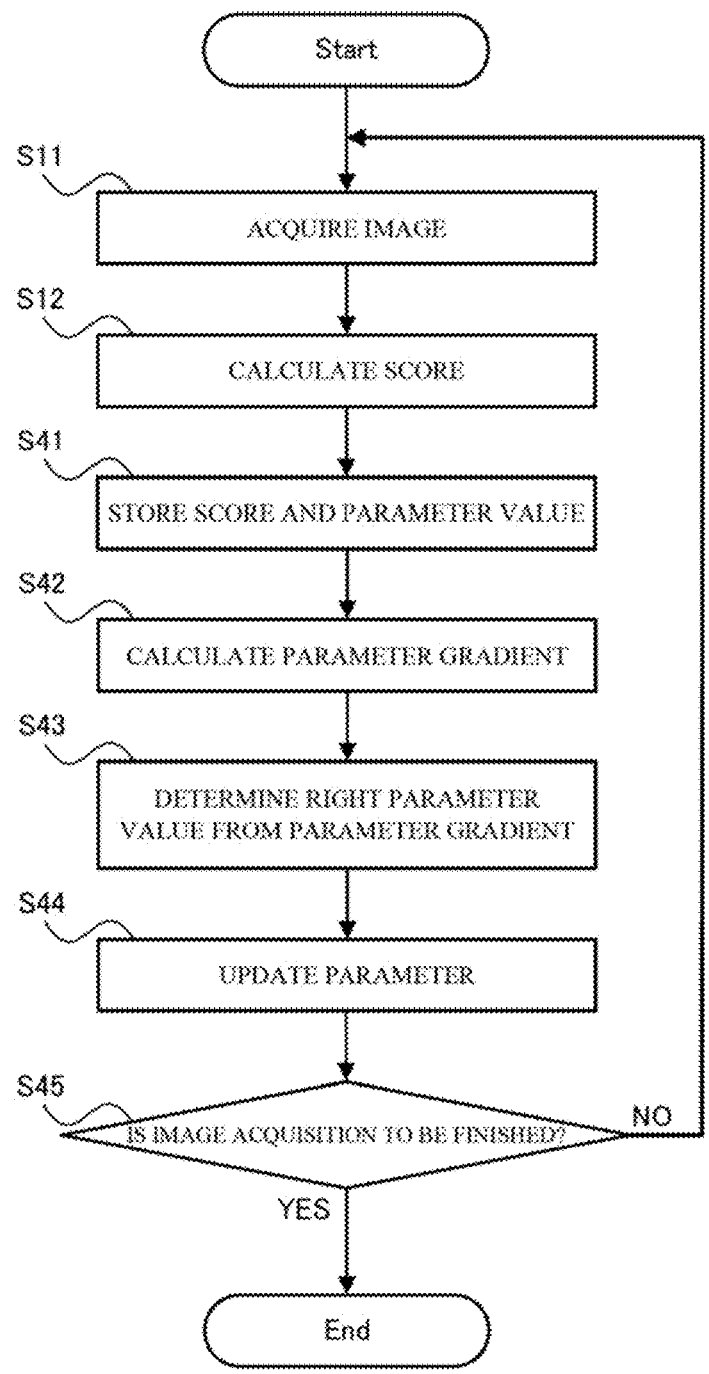
FIG. 9 is a flowchart showing a flow of operation of the parameter optimization system according to the fourth embodiment.

As shown in FIG. 9, when the parameter optimization system 10 according to the fourth embodiment starts operation, first, the image sensor 110 acquires an image (step S11). Note that in the parameter optimization system 10 according to the fourth embodiment, the image sensor 110 sequentially acquires images. For example, the image sensor 110 is configured as an image sensor of a camera that picks up moving images, and consecutively acquires a plurality of frames of images.

Subsequently, the score calculation unit 130 calculates a score from each image acquired by the image sensor 110 (step S12). The score storage unit 160 stores the score calculated by the score calculation unit 130 and a parameter value (step S41).

Thereafter, the gradient calculation unit 145 in the parameter determination unit 140 calculates a parameter gradient from the plurality of scores and parameter values stored in the score storage unit 160 (step S42). The parameter determination unit 140 determines a right parameter value, based on the parameter gradient calculated by the gradient calculation unit 145 (step S43).

Subsequently, the parameter setting unit 120 updates (changes) the sensing parameter of the image sensor 110, according to the right parameter value determined by the parameter determination unit 140 (step S44). Accordingly, in the parameter optimization system 10 according to the fourth embodiment, the sensing parameter of the image sensor 110 is updated each time a new right parameter value is determined.

Subsequently, the parameter optimization system 10 according to the fourth embodiment determines whether or not acquisition of an image by the image sensor 110 is to be finished (step S45). When acquisition of an image is to be finished (step S45: YES), the series of processes is terminated immediately. When acquisition of an image is not to be finished (step S45: NO), the parameter optimization system 10 according to the fourth embodiment repeats the processes again from step S11. Accordingly, while images are acquired by the image sensor 110 (that is, while it is continued to shoot images), the processes of determining a right parameter value from a parameter gradient and updating the sensing parameter of the image sensor 110 are executed repeatedly.

Note that the parameter optimization system 10 according to the fourth embodiment may be configured to stop the above-described series of processes when right parameter values converge to a specific value (in other words, when it becomes almost meaningless to update the sensing parameter) even if acquisition of images is not to be finished. The parameter optimization system 10 according to the fourth embodiment may be configured to start the series of processes again when a situation requires that the sensing parameter of the image sensor be updated again (for example, when a lighting environment around the image sensor 110 has changed, or the like) after the series of processes is stopped.

(Technical Effects)

Next, technical effects achieved by the parameter optimization system 10 according to the fourth embodiment are described.

As described in FIGS. 8 and 9, in the parameter optimization system 10 according to the fourth embodiment, a right parameter value is determined according to a sequentially calculated parameter gradient, and each time such a new right parameter value is determined, the sensing parameter of the image sensor 110 is updated. With the configuration thus made, an optimal right parameter value can be searched for while images are sequentially acquired. Accordingly, for example, when moving images are shot, appropriated shooting can be realized while the sensing parameter adapted to the then environment is reflected at all times. Such an effect works remarkably, for example, when images are consecutively picked up in a situation where a lighting environment around the image sensor 110 changes over time (for example, from afternoon to evening, from evening to night, or the like).

Fifth Embodiment

A parameter optimization system 10 according to a fifth embodiment is described with reference to FIGS. 10 and 11. The fifth embodiment is different from the above-described fourth embodiment only in part of the configuration and operation, and other part may be similar to those of the fourth embodiment. Accordingly, in the following, the part different from each embodiment described already is described in detail, and a description of other overlapping part is omitted as appropriate.

(Functional Configuration)

First, a functional configuration of the parameter optimization system 10 according to the fifth embodiment is described with reference to FIG. 10. FIG. 10 is a block diagram showing the functional configuration of the parameter optimization system according to the fifth embodiment. Note that in FIG. 10, elements similar to the constitutional elements shown in FIG. 8 are denoted by the same reference numbers as in FIG. 8.

Figure 10:
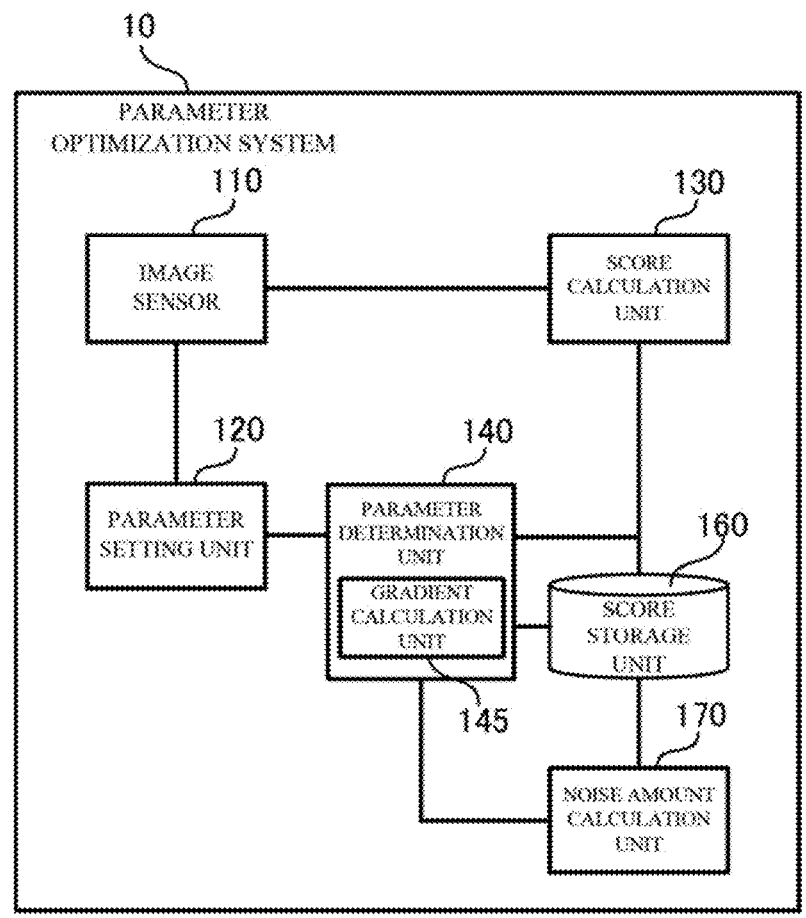
FIG. 10 is a block diagram showing a functional configuration of a parameter optimization system according to a fifth embodiment.

As shown in FIG. 10, the parameter optimization system 10 according to the fifth embodiment includes, as constitutional elements for implementing functions of the parameter optimization system 10, an image sensor 110, a parameter setting unit 120, a score calculation unit 130, a parameter determination unit 140, a score storage unit 160, and a noise amount calculation unit 170. In other words, the parameter optimization system 10 according to the fifth embodiment further includes the noise amount calculation unit 170, in addition to the constitutional elements in the fourth embodiment (see FIG. 8). Note that the noise amount calculation unit 170 may be implemented by, for example, the above-described processor 11 (see FIG. 1).

The noise amount calculation unit 170 is configured to be able to calculate an amount of noise included in a score calculated by the score calculation unit 130. The "amount of noise" here is an amount of noise that is, due to a noise in an image acquired by the image sensor 110, included in a score calculated from the image. Although a method of calculating the amount of noise is not particularly limited, for example, a plurality of images may be acquired by the image sensor 110 beforehand, and the amount of noise may be calculated by using a standard deviation or the like obtained from the plurality of images. A configuration is made such that the amount of noise calculated by the noise amount calculation unit 170 is outputted to the parameter determination unit 140.

(Flow of Operation)

Next, a flow of operation of the parameter optimization system 10 according to the fifth embodiment is described with reference to FIG. 11. FIG. 11 is a flowchart showing the flow of the operation of the parameter optimization system according to the fifth embodiment. Note that in FIG. 11, processes similar to the processes shown in FIG. 9 are denoted by the same reference numbers as in FIG. 9.

Figure 11:
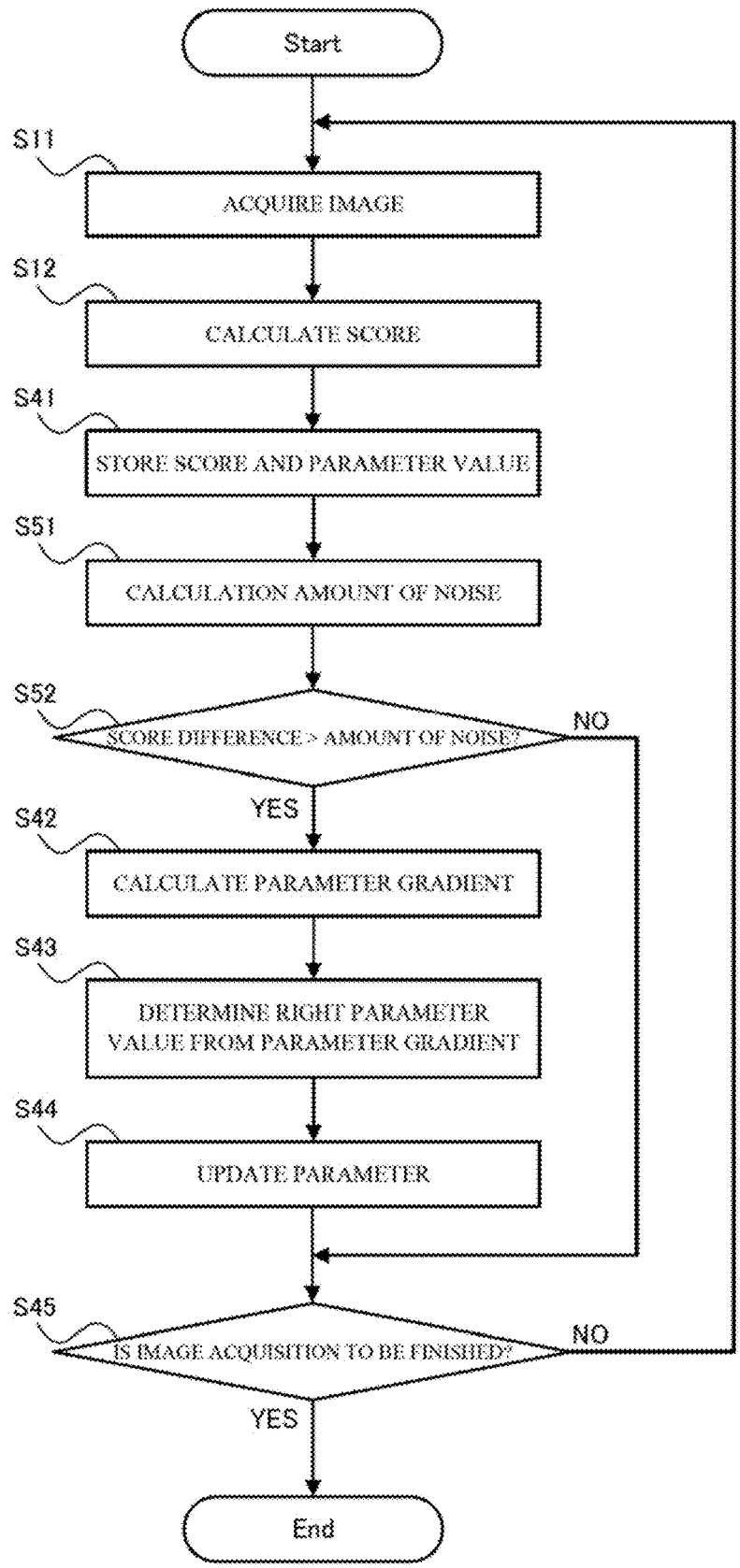
FIG. 11 is a flowchart showing a flow of operation of the parameter optimization system according to the fifth embodiment.

As shown in FIG. 11, when the parameter optimization system 10 according to the fifth embodiment starts operation, first, the image sensor 110 acquires an image (step S11). Note that in the parameter optimization system 10 according to the fifth embodiment, the image sensor 110 sequentially acquires images, as in the fourth embodiment. For example, the image sensor 110 is configured as an image sensor of a camera that picks up moving images, and consecutively acquires a plurality of frames of images.

Subsequently, the score calculation unit 130 calculates a score from each image acquired by the image sensor 110 (step S12). The score storage unit 160 stores the score calculated by the score calculation unit 130 and a parameter value (step S41).

Subsequently, the noise amount calculation unit 170 calculates an amount of noise in the score (step S51). Note that the calculation of an amount of noise may be executed before the calculation of a score in step S12, or the storage of a score in step S41. When an amount of noise is calculated from a different image from an image acquired in step S11, the process of calculating an amount of noise may be executed before step S11. In other words, the process of calculating an amount of noise may be executed before the series of processes in FIG. 11 is started.

Subsequently, the parameter determination unit 140 determines whether or not a score difference used when the gradient calculation unit 145 calculates a parameter gradient is larger than the amount of noise calculated by the noise amount calculation unit 170 (step S52).

When the score difference is larger than the amount of noise (step S52: YES), the gradient calculation unit 145 in the parameter determination unit 140 calculates a parameter gradient from a plurality of scores and parameter values stored in the score storage unit 160 (step S42). The parameter determination unit 140 determines a right parameter value, based on the parameter gradient calculated by the gradient calculation unit 145 (step S43). Thereafter, the parameter setting unit 120 updates the sensing parameter of the image sensor 110, according to the right parameter value determined by the parameter determination unit 140 (step S44).

In contrast, when the score difference is smaller than the amount of noise (step S52: NO), the above-described processes in steps S42 to S44 are omitted. In other words, in such a case, the process of calculating a parameter gradient, the process of determining a right parameter value based on the parameter gradient, and the process of updating the sensing parameter according to the right parameter value are not executed.

Note that the process in step S52 of determining whether or not the score difference is larger than the amount of noise may be executed after the calculation of a parameter gradient in step S42 is executed. In such a case, when the score difference is smaller than the amount of noise, the processes in steps S43 and S44 are omitted. In other words, there are some cases where although a parameter gradient is calculated, the process of determining a right parameter value and the process of updating the sensing parameter are not executed. Moreover, the process in step S52 of determining whether or not the score difference is larger than the amount of noise may be executed after the determination of a right parameter value in step S43 is executed. In such a case, when the score difference is smaller than the amount of noise, only the process in step S44 is omitted. In other words, there are some cases where although the process of calculating a parameter gradient and the process of determining a right parameter value are executed, the updating of the sensing parameter according to the right parameter value is not executed.

Subsequently, the parameter optimization system 10 according to the fifth embodiment determines whether or not acquisition of an image by the image sensor 110 is to be finished (step S45). When acquisition of an image is to be finished (step S45: YES), the series of processes is terminated immediately. When acquisition of an image is not to be finished (step S45: NO), the parameter optimization system 10 according to the fifth embodiment repeats the processes again from step S11.

(Technical Effects)

Next, technical effects achieved by the parameter optimization system 10 according to the fifth embodiment are described.

As described in FIGS. 10 and 11, in the parameter optimization system 10 according to the fifth embodiment, a score difference and an amount of noise are compared, and it is determined, depending on a result of the comparison, whether or not to update the sensing parameter. With the configuration thus made, the sensing parameter can be updated after significance of the score difference is determined based on the amount of noise. Specifically, when the score difference is larger than the amount of noise, it can be determined that the score difference has significance (is not an error caused by noise), and the sensing parameter can be updated. When the score difference is smaller than the amount of noise, it can be determined that the score difference has no significance (is an error caused by noise), and the updating of the sensing parameter can be omitted.

Sixth Embodiment

A parameter optimization system 10 according to a sixth embodiment is described with reference to FIGS. 12 and 13. Note that the sixth embodiment is different from the above-described first to fifth embodiments only in part of the configuration and operation, and other part may be similar to those of the first to fifth embodiments. Accordingly, in the following, the part different from each embodiment described already is described in detail, and a description of other overlapping part is omitted as appropriate.

(Functional Configuration)

First, a functional configuration of the parameter optimization system 10 according to the sixth embodiment is described with reference to FIG. 12. FIG. 12 is a block diagram showing the functional configuration of the parameter optimization system according to the sixth embodiment. Note that in FIG. 12, elements similar to the constituent elements shown in FIG. 2 are denoted by the same reference numbers as in FIG. 2.

Figure 12:
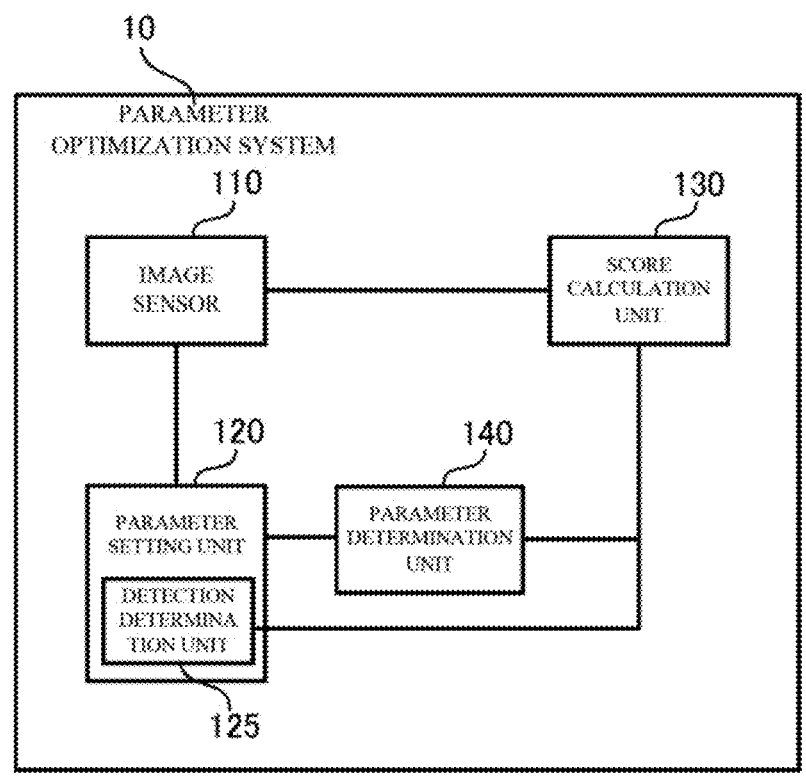
FIG. 12 is a block diagram showing a functional configuration of a parameter optimization system according to a sixth embodiment.

As shown in FIG. 12, the parameter optimization system 10 according to the sixth embodiment includes, as constituent elements for implementing functions of the parameter optimization system 10, an image sensor 110, a parameter setting unit 120, a score calculation unit 130, and a parameter determination unit 140. The parameter setting unit 120 according to the sixth embodiment in particular incudes a detection determination unit 125.

The detection determination unit 125 is configured to be able to determine, based on a score calculated by the score calculation unit 130, whether or not an image-pickup target is detected from an image. Specifically, the detection determination unit 125 is configured to be able to determine whether or not an image-pickup target is detected from an image, based on whether or not a score calculated by the score calculation unit 130 is a value corresponding to a state in which the image-pickup target is not detected. Note that the score calculated by the score calculation unit 130 according to the sixth embodiment is a value that changes according to an image-pickup target detected from an image. For example, the score calculation unit 130 detects a human face from an image, and calculates a score indicating whether or not the face is a registered face. In such a case, the score calculated by the score calculation unit 130 changes according to, for example, a degree of matching between the face detected from the image and the registered face. However, when no human face is detected, the score is "0". In such an example, the detection determination unit 125 can determine whether or not a face is detected, based on whether the calculated score is "0" or "other".

(Flow of Operation)

Next, a flow of operation of the parameter optimization system 10 according to the sixth embodiment is described with reference to FIG. 13. FIG. 13 is a flowchart showing the flow of the operation of the parameter optimization system according to the sixth embodiment. Note that in FIG. 13, processes similar to the processes shown in FIG. 3 are denoted by the same reference numbers as in FIG. 3.

Figure 13:
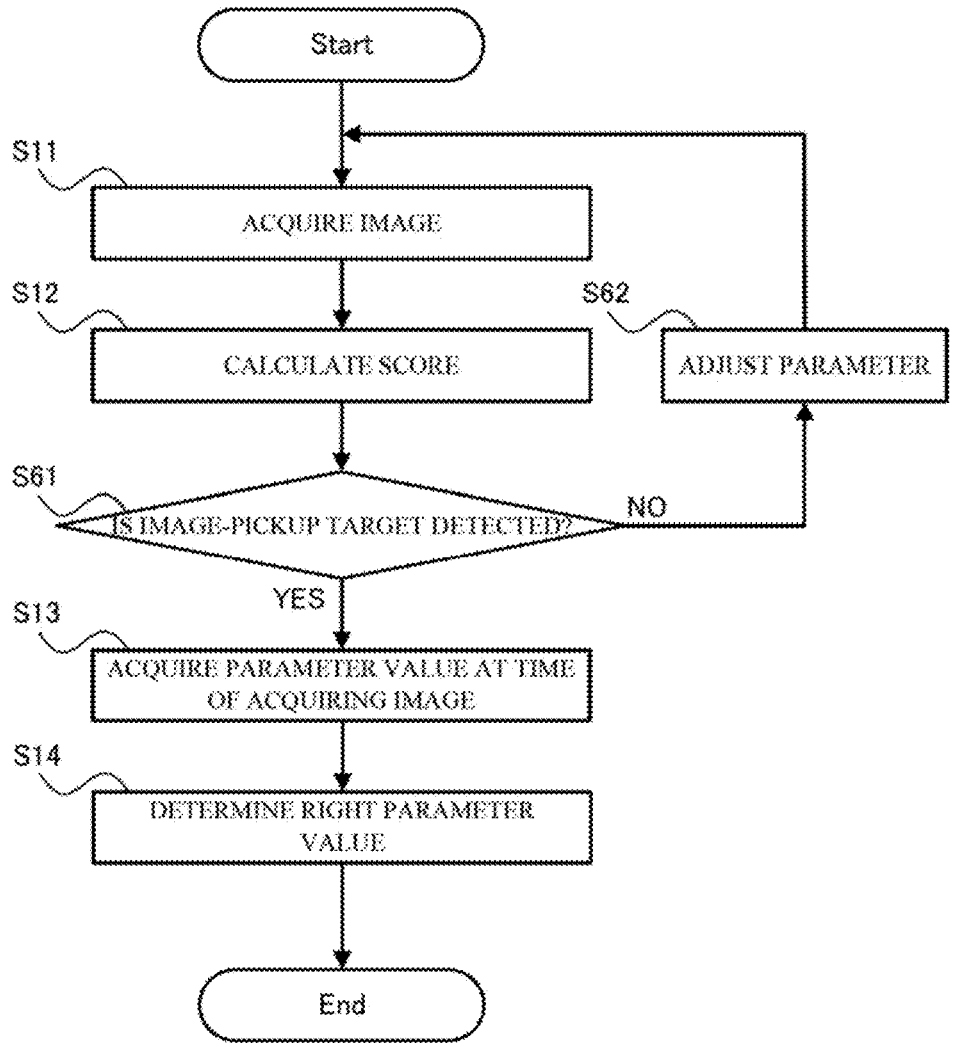
FIG. 13 is a flowchart showing a flow of operation of the parameter optimization system according to the sixth embodiment.

As shown in FIG. 13, when the parameter optimization system 10 according to the sixth embodiment starts operation, first, the image sensor 110 acquires an image (step S11).

Subsequently, the score calculation unit 130 calculates a score from the image acquired by the image sensor 110 (step S12). The score calculated by the score calculation unit 130 is outputted to the parameter determination unit 140 and the detection determination unit 125.

Subsequently, the detection determination unit 125 determines, based on the score calculated by the score calculation unit 130, whether or not an image-pickup target is detected from the image (step S61). When it is determined that an image-pickup target is not detected from the image (step S61: NO), the parameter setting unit 120 makes an adjustment, by changing a sensing parameter of the image sensor 110, such that the image-pickup target can be detected from the image acquired by the image sensor 110 (step S62). In other words, the parameter setting unit 120 adjusts the sensing parameter such that it becomes easy to detect the image-pickup target. For example, when the image is too dark to detect the image-pickup target, the parameter setting unit 120 may make an adjustment, by changing a parameter related to brightness among sensing parameters, such that the image acquired by the image sensor 110 becomes brighter. When the image is too bright to detect the image-pickup target, the parameter setting unit 120 may make an adjustment, by changing the parameter related to brightness among the sensing parameters, such that the image acquired by the image sensor 110 becomes darker.

Thereafter, the parameter optimization system 10 according to the sixth embodiment repeats the processes again from step S11. Accordingly, when a state continues in which the image-pickup target cannot be detected from an image, the sensing parameter is further changed. For example, when the sensing parameter is adjusted such that the image becomes brighter, the image is adjusted to be further brighter. Note that when the sensing parameter is further changed, the first changed sensing parameter may be changed to be greater, or a different sensing parameter from the first changed sensing parameter may be changed.

Incidentally, when no image-pickup target is ever included in an image, an image-pickup target will never be detected from the image even if the sensing parameter is adjusted in whatever manner. Accordingly, when an image-pickup target cannot be detected even after the sensing parameter is changed to a certain value or greater (for example, even after the image is made to have more brightness corresponding to the certain value or greater), the adjusted sensing parameter may be set back to an initial value, to shift to a state in which an external execution command or a periodical execution command is waited for.

In contrast, when it is determined that an image-pickup target is detected from the image (step S61: YES), the parameter determination unit 140 acquires, from the parameter setting unit 120, information related to the sensing parameter at a time of picking up the image from which the score is calculated (step S13). The parameter determination unit 140 determines a right parameter value, based on the score and the information related to the sensing parameter corresponding to the score (step S14).

(Technical Effects)

Next, technical effects achieved by the parameter optimization system 10 according to the sixth embodiment are described.

As described in FIGS. 12 and 13, in the parameter optimization system 10 according to the sixth embodiment, when an image-pickup target is not detected from an image, an adjustment is made, by adjusting the sensing parameter, such that the image-pickup target can be detected from the image. With the configuration thus made, a situation can be prevented in which a right parameter value cannot be determined due to no image-pickup target being detected from an image. Specifically, when an image-pickup target is not detected from an image, the score is "0", or the score substantially cannot be calculated. Accordingly, when an image-pickup target cannot be detected from an image, a parameter gradient cannot be calculated. In such a situation, it is difficult to determine an appropriate right parameter value. However, in the present embodiment, when an image-pickup target is not detected from an image, an adjustment is made to bring about a state in which it is easy to detect the image-pickup target from the image (for example, an adjustment is made such that the image becomes brighter). Accordingly, it can be assured that an image-pickup target is detected from an image, and an appropriate right parameter value can be determined.

Seventh Embodiment

A parameter optimization system 10 according to a seventh embodiment is described with reference to FIGS. 14 to 16. Note that the seventh embodiment is different from the above-described first to sixth embodiments only in part of the configuration and operation, and other part may be similar to those of the first to sixth embodiments. Accordingly, in the following, the part different from each embodiment described already is described in detail, and a description of other overlapping part is omitted as appropriate.

(Functional Configuration)

First, a functional configuration of the parameter optimization system 10 according to the seventh embodiment is described with reference to FIG. 14. FIG. 14 is a block diagram showing the functional configuration of the parameter optimization system according to the seventh embodiment. Note that in FIG. 14, elements similar to the constitutional elements shown in FIG. 2 are denoted by the same reference numbers as in FIG. 2.

Figure 14:
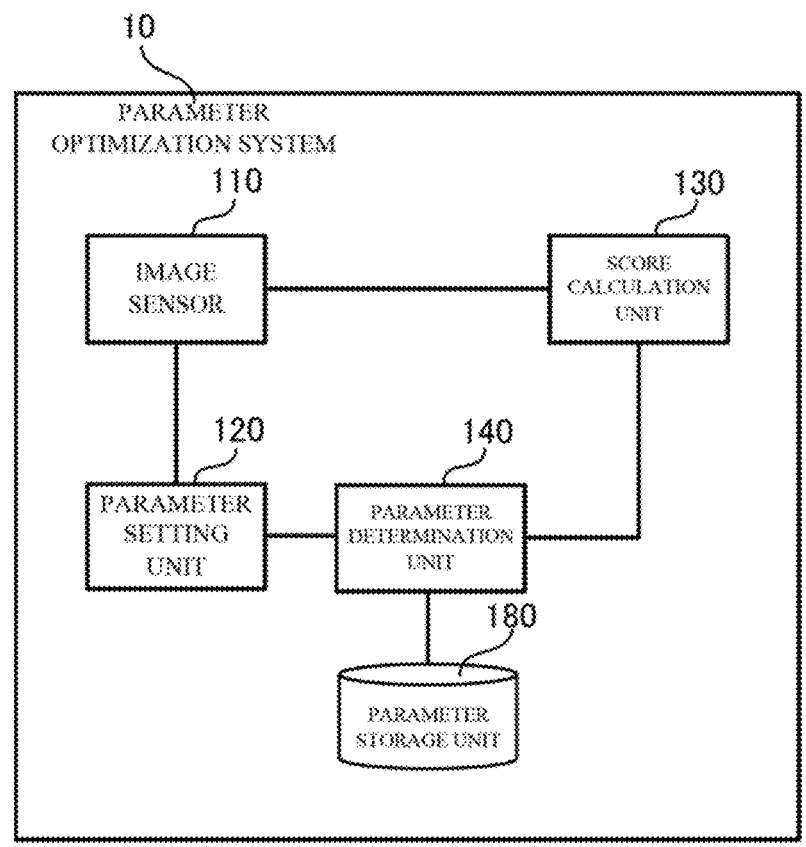
FIG. 14 is a block diagram showing a functional configuration of a parameter optimization system according to a seventh embodiment.

As shown in FIG. 14, the parameter optimization system 10 according to the seventh embodiment includes, as constitutional elements for implementing functions of the parameter optimization system 10, an image sensor 110, a parameter setting unit 120, a score calculation unit 130, a parameter determination unit 140, and a parameter storage unit 180. In other words, the parameter optimization system 10 according to the seventh embodiment further includes the parameter storage unit 180, in addition to the constitutional elements in the first embodiment (see FIG. 2). Note that the parameter storage unit 180 may be implemented by, for example, the above-described storage device 14 (see FIG. 1).

The parameter storage unit 180 is configured to be able to store right parameter values determined by the parameter determination unit 140, in a plurality of patterns. More specifically, the parameter storage unit 180 is configured to be able to store the plurality of patterns of right parameter values corresponding to light environments, respectively. The right parameter values stored in the parameter storage unit 180 may be in two patterns, or three or more patterns.

(Flow of Operation)

Next, a flow of operation of the parameter optimization system 10 according to the seventh embodiment is described with reference to FIG. 15. FIG. 15 is a flowchart showing the flow of the operation of the parameter optimization system according to the seventh embodiment. Note that in FIG. 15, processes similar to the processes shown in FIG. 3 are denoted by the same reference numbers as in FIG. 3.

Figure 15:
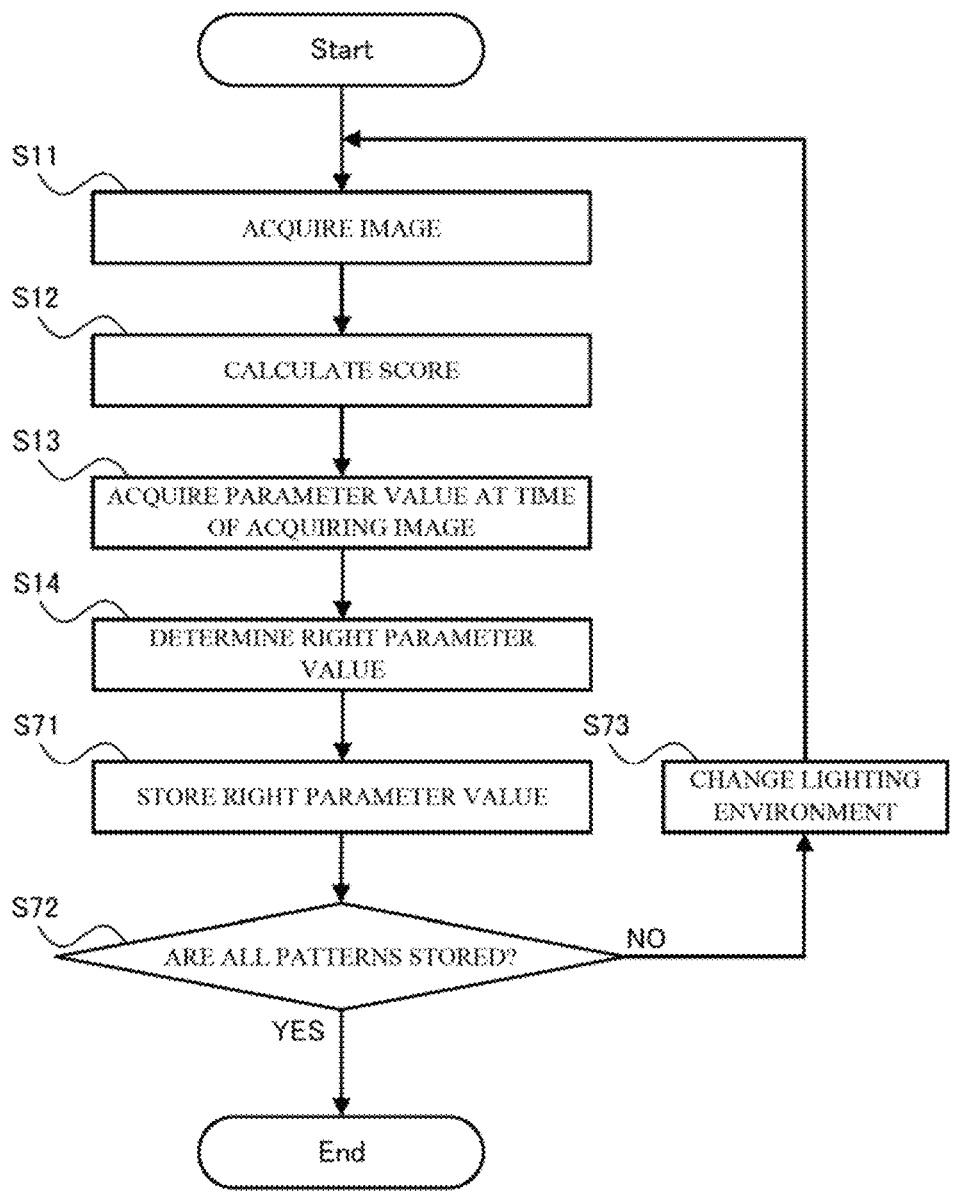
FIG. 15 is a flowchart showing a flow of operation of the parameter optimization system according to the seventh embodiment.

As shown in FIG. 15, when the parameter optimization system 10 according to the seventh embodiment starts operation, first, the image sensor 110 acquires an image (step S11).

Subsequently, the score calculation unit 130 calculates a score from the image acquired by the image sensor 110 (step S12). The score calculated by the score calculation unit 130 is outputted to the parameter determination unit 140. The parameter determination unit 140 acquires, from the parameter setting unit 120, information related to a sensing parameter at a time of picking up the image from which the score is calculated (step S13).

Subsequently, the parameter determination unit 140 determines a right parameter value, based on the score and the information related the sensing parameter corresponding to the score (step S14). Thereafter, the parameter storage unit 180 stores the right parameter value determined by the parameter determination unit 140 (step S71). In other words, the parameter storage unit 180 stores one pattern of the right parameter value corresponding to one lighting environment.

Subsequently, the parameter optimization system 10 according to the seventh embodiment determines whether or not patterns of right parameter values corresponding to all lighting environments are stored (step S72). In other words, it is determined whether or not a preset number of right parameter values are stored.

When patterns of right parameter values corresponding to all lighting environments are stored (step S72: YES), the series of processes is terminated. When patterns of right parameter values corresponding to all lighting environments are not stored (step S72: NO), the lighting environment is changed to another one (step S73), and the processes are repeated again from step S11. By repeating the processes in steps S11 to S18 in such a manner, a plurality of patterns of right parameter values corresponding to different lighting environments are stored in the parameter storage unit 180. Note that the change of the lighting environment in step S73 may be implemented, for example, by changing intensity of illumination, or with passage of time (for example, by waiting for time to pass from afternoon to night).

(Specific Examples of Lighting Environment)

Figure 16:
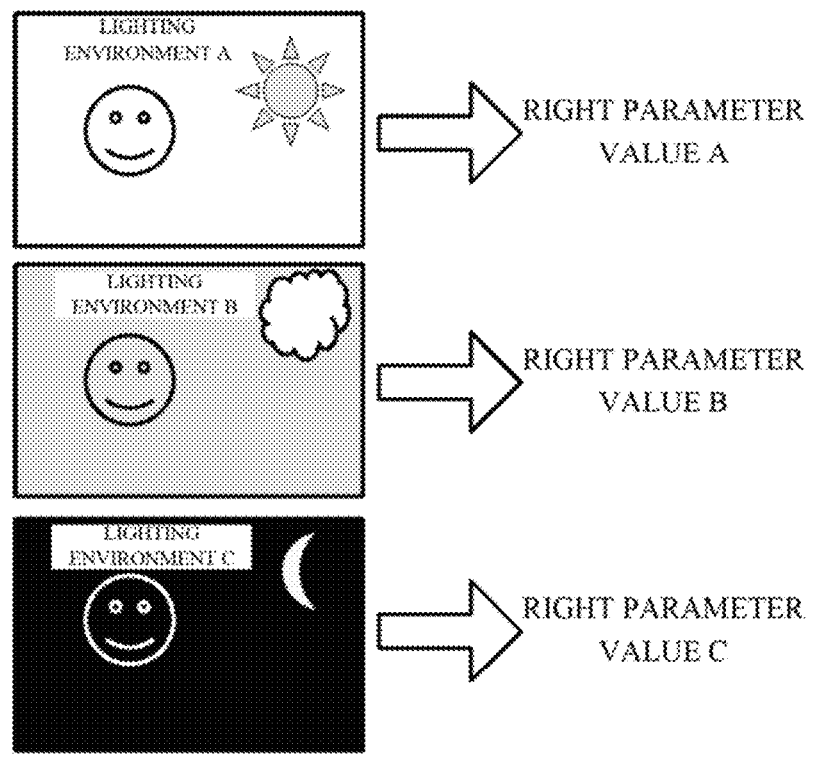
FIG. 16 is a conceptual diagram showing examples of differences between lighting environments, in the parameter optimization system according to the seventh embodiment.

Next, a right parameter value determined for each lighting environment is described specifically with reference to FIG. 16. FIG. 16 is a conceptual diagram showing examples of differences among lighting environments, in the parameter optimization system according to the seventh embodiment.

As shown in FIG. 16, the parameter optimization system 10 according to the seventh embodiment may be configured such that the parameter storage unit 180 stores right parameter values corresponding to three lighting environments, namely, lighting environment A, lighting environment B, and lighting environment C. More specifically, the parameter storage unit 180 may store three patterns of: a right parameter value A corresponding to the lighting environment A that is sunny and bright; a right parameter value B corresponding to the lighting environment B that is cloudy and gray; and a right parameter value C corresponding to the lighting environment C that is dark at night.

Note that the above-described examples are only examples, and a plurality of patterns of right parameter values corresponding to other lighting environments may be determined. Although it is assumed in the above-described examples that images are picked up outdoors, when images are picked up indoors, a plurality of patterns of right parameter values may be determined, for example, according to intensities of illumination or the like.

(Technical Effects)

Next, technical effects achieved by the parameter optimization system 10 according to the seventh embodiment are described.

As described in FIGS. 14 to 16, in the parameter optimization system 10 according to the seventh embodiment, a plurality of patterns of right parameter values are stored according to different lighting environments. With the configuration thus made, an image can be appropriately picked up by selecting an appropriate right parameter value from the plurality of patterns, based on a lighting environment at a time of picking up the image. Accordingly, an appropriate image can be picked up relatively easily, without determining a new right parameter value at a timing of picking up an image.

Eighth Embodiment

A parameter optimization system 10 according to an eighth embodiment is described with reference to FIGS. 17 to 20. Note that the eighth embodiment is different from the above-described seventh embodiment only in part of the configuration and operation, and other part may be similar to those of the seventh embodiment. Accordingly, in the following, the part different from each embodiment described already is described in detail, and a description of other overlapping part is omitted as appropriate.

(Functional Configuration)

Figure 17:
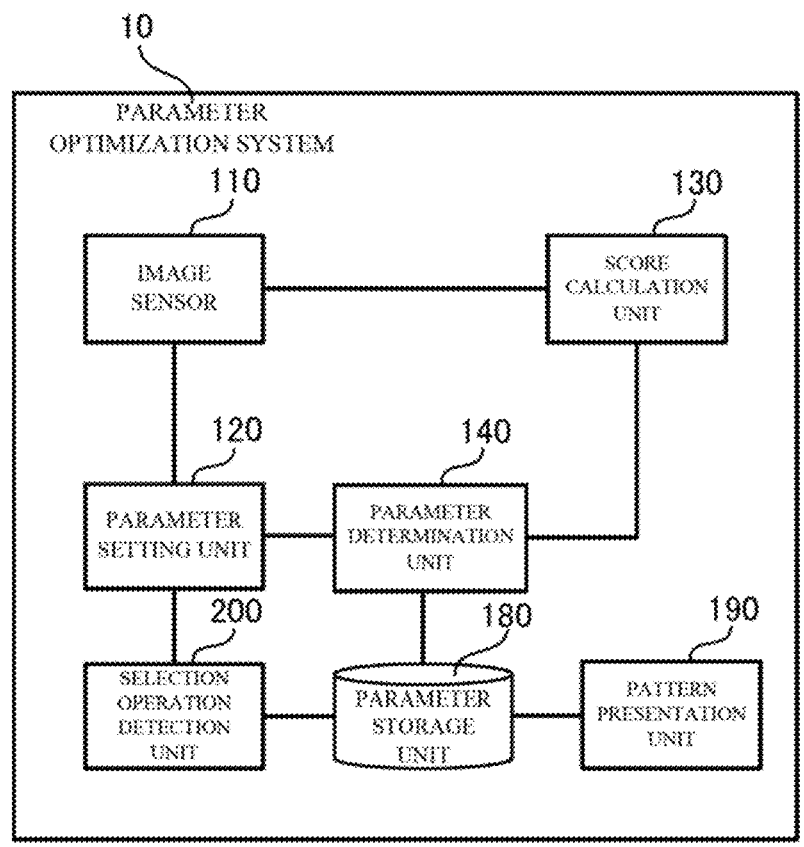
FIG. 17 is a block diagram showing a functional configuration of a parameter optimization system according to an eighth embodiment.

First, a functional configuration of the parameter optimization system 10 according to the eighth embodiment is described with reference to FIG. 17. FIG. 17 is a block diagram showing the functional configuration of the parameter optimization system according to the eighth embodiment. Note that in FIG. 17, elements similar to the constitutional elements shown in FIG. 14 are denoted by the same reference numbers as in FIG. 14.

As shown in FIG. 17, the parameter optimization system 10 according to the eighth embodiment includes, as constitutional elements for implementing functions of the parameter optimization system 10, an image sensor 110, a parameter setting unit 120, a score calculation unit 130, a parameter determination unit 140, a parameter storage unit 180, a pattern presentation unit 190, and a selection operation detection unit 200. In other words, the parameter optimization system 10 according to the eighth embodiment further includes the pattern presentation unit 190 and the selection operation detection unit 200, in addition to the components in the seventh embodiment (see FIG. 14). Each of the pattern presentation unit 190 and the selection operation detection unit 200 may be implemented by, for example, the above-described processor 11 (see FIG. 1). The pattern presentation unit 190 may include the above-described output device 16 (see FIG. 1). The selection operation detection unit 200 may include the above-described input device 15 (see FIG. 1).

The pattern presentation unit 190 is configured to be able to present a plurality of patterns of right parameter values stored in the parameter storage unit 180, to a user of the system. The pattern presentation unit 190 may present the plurality of patterns of right parameter values, for example, by displaying images on a display. Alternatively, the pattern presentation unit 190 may present the plurality of patterns of right parameter values by using voice through a speaker or the like.

The selection operation detection unit 200 is configured to be able to detect a selection operation (that is, an operation of selecting one pattern from among the presented patterns) made by a user to which the plurality of patterns of right parameter values are presented by the pattern presentation unit 190. For example, the selection operation detection unit 200 may be configured to be able to detect an operation of a terminal performed by the user. A configuration is made such that information related to the selection operation detected by the selection operation detection unit 200 (for example, information related to a pattern selected by the user) is outputted to the parameter setting unit 120.

(Flow of Operation)

Figure 18:
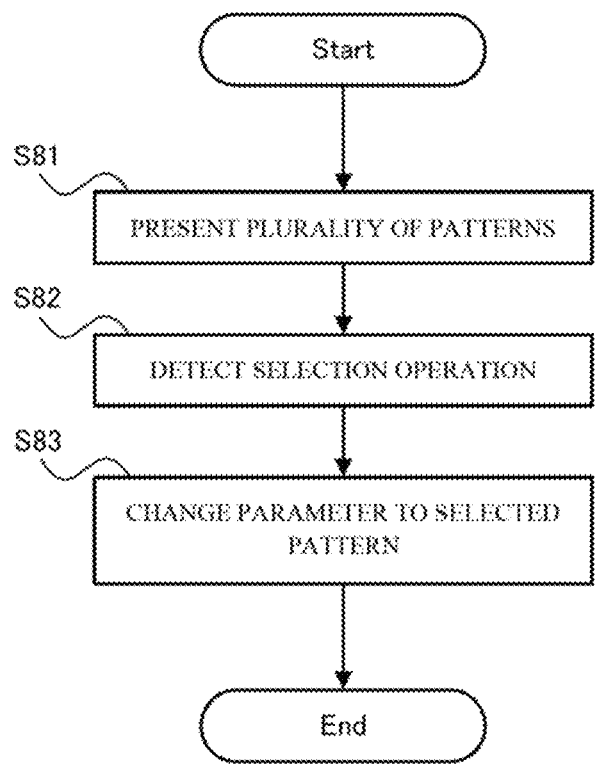
FIG. 18 is a flowchart showing a flow of operation of the parameter optimization system according to the eighth embodiment.

Next, a flow of operation of the parameter optimization system 10 according to the eighth embodiment is described with reference to FIG. 18. FIG. 18 is a flowchart showing the flow of the operation of the parameter optimization system according to the eighth embodiment. Note that a series of processes shown in FIG. 18 is processes executed after a plurality of patterns of right parameter values are determined. Processes before the plurality of patterns of right parameter values are determined may be similar to the processes in the seventh embodiment (see FIG. 15).

As shown in FIG. 18, when the parameter optimization system 10 according to the eighth embodiment starts operation, first, the pattern presentation unit 190 presents the plurality of patterns of right parameter values stored in the parameter storage unit 180 to a user of the system (step S81).

Subsequently, the selection operation detection unit 200 detects a selection operation made by the user (step S82). Note that when a selection operation made by the user is not detected (for example, no selection operation is detected when a predetermined time period has passed since the presentation), notification may be given to prompt the user to make a selection operation. Alternatively, any one pattern may be automatically selected, without waiting for the user to make a selection operation.

Subsequently, in response to the selection operation detected by the selection operation detection unit 200, the parameter setting unit 120 changes the sensing parameter of the image sensor 110. Specifically, the parameter setting unit 120 changes the sensing parameter of the image sensor 110 such that the sensing parameter has a right parameter value in the pattern selected through the selection operation by the user (step S83).

Note that the selection operation detection unit 200 may continue to detect a selection operation also after the sensing parameter is changed in step S83. When a new selection operation made by the user is detected, the parameter setting unit 120 may change the sensing parameter again in response to the newly detected selection operation. As described above, the detection of a selection operation and the change of the sensing parameter may be executed a plurality of times.

(UI)

Figure 19:
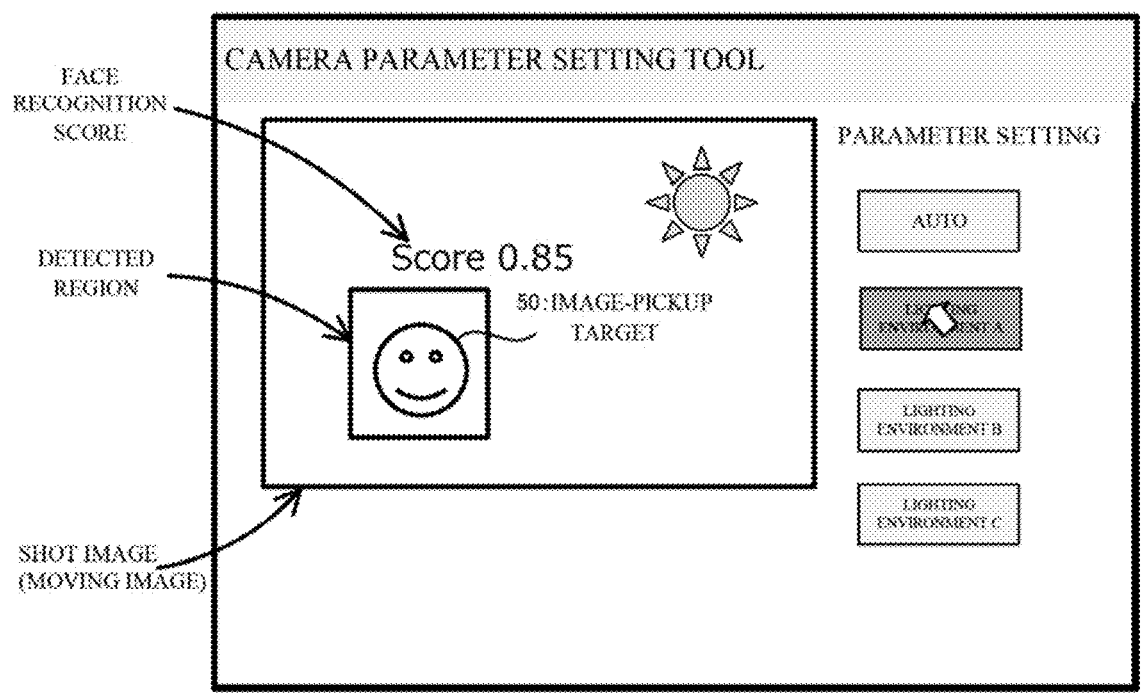
FIG. 19 is a diagram (version 1) showing an example of presentation by the parameter optimization system according to the eighth embodiment.
Figure 20:
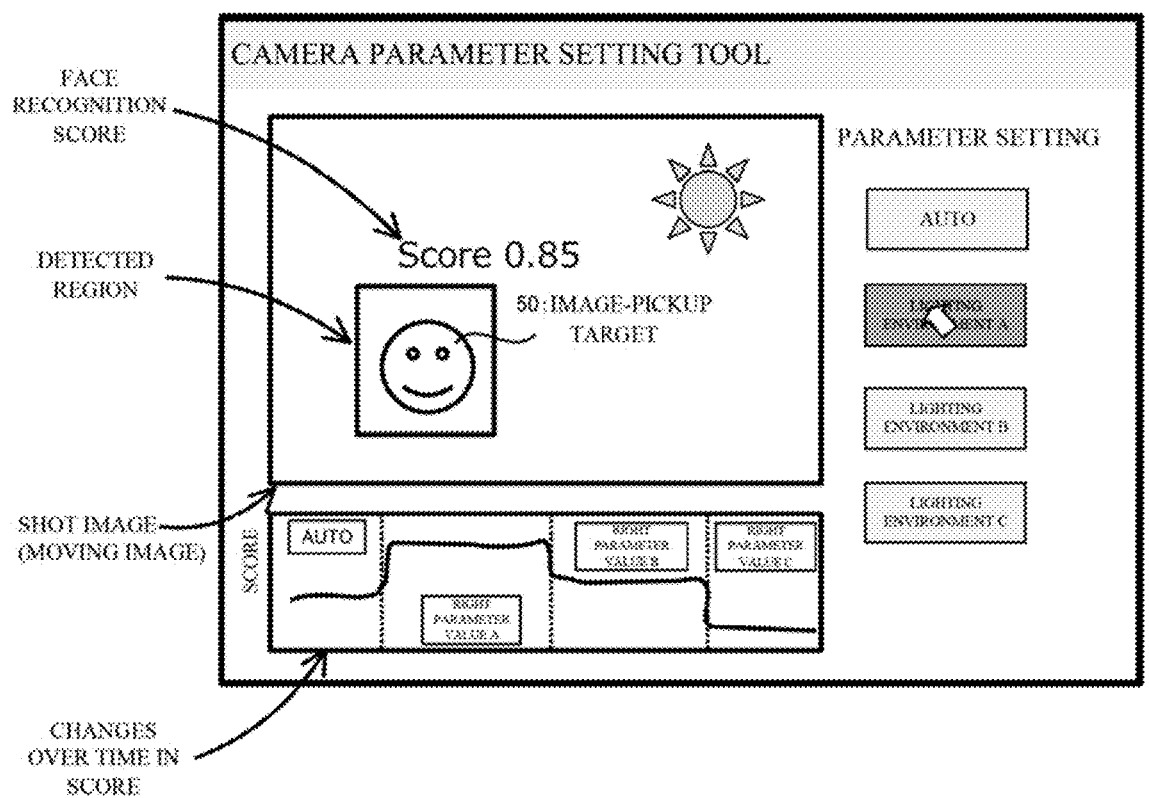
FIG. 20 is a diagram (version 2) showing an example of presentation by the parameter optimization system according to the eighth embodiment.

Next, UIs (User Interfaces) applicable to the parameter optimization system 10 according to the eighth embodiment are described specifically with reference to FIGS. 19 and 20. FIG. 19 is a diagram (version 1) showing an example of presentation by the parameter optimization system according to the eighth embodiment. FIG. 20 is a diagram (version 2) showing an example of presentation by the parameter optimization system according to the eighth embodiment. Note that FIGS. 19 and 20 show examples of presentation in a case where a human face is detected from an image and a face recognition score is calculated.

In the example shown in FIG. 19, a shot image (moving image) is displayed in an area on a left side of a screen. On the image, a rectangular region including a detected face, and a calculated face recognition score are displayed in a superimposed manner. Moreover, buttons for setting the sensing parameter are provided in an area on a right side of the screen. Specifically, four buttons of "auto", "lighting environment A", "lighting environment B", and "lighting environment C" are arranged in the same order from the top. A user can select one pattern from among a plurality of patterns of right parameter values (that is, make a selection operation) by clicking on any one of the four buttons.

Note that the example shown in FIG. 19 is in a state where the user selects "lighting environment A" (a color of the button is different from those of the others). Accordingly, at a timing shown in FIG. 19, images are picked up with a right parameter value corresponding to the lighting environment A. When the user clicks on the button of "lighting environment B", the sensing parameter of the image sensor 110 is changed to a right parameter value corresponding to the lighting environment B. Similarly, when the user clicks on the button of "lighting environment C", the sensing parameter of the image sensor 110 is changed to a right parameter value corresponding to the lighting environment C. Note that when the user clicks on the button of "auto", the sensing parameter of the image sensor 110 is automatically changed to the right parameter value corresponding to any one of the lighting environments A, B, and C, or another random value of the sensing parameter.

In the example shown in FIG. 20, a graph indicating changes over time in the score is displayed in a lower left area on a screen. When the graph is viewed in a time direction, it can be seen that a user first selects "auto", next selects "lighting environment A (right parameter value A)", then selects "lighting environment B (right parameter value B)", and lastly selects "lighting environment C (right parameter value C)". When score values in the individual patterns are compared to each other, it can be seen that the score is highest when the lighting environment A is selected. Accordingly, the user can easily find that the right parameter value A corresponding to the lighting environment A ought to be selected in order to make the score higher.

(Technical Effects)

Next, technical effects achieved by the parameter optimization system 10 according to the eighth embodiment are described.

As described in FIGS. 17 to 20, in the parameter optimization system 10 according to the eighth embodiment, a plurality of patterns of right parameter values are presented to a user, and the sensing parameter of the image sensor 110 is changed according to a selection operation made by the user. With the configuration thus made, since a right parameter value can be selected by the user, an image can be picked up with an appropriate value of the sensing parameter even in a case where, for example, it is difficult to automatically select a right parameter value. Moreover, if a configuration is made such that changes in images are presented to a user in real time as in the UIs shown in FIGS. 19 and 20, a right pattern can be selected more appropriately.

A processing method in which a program causing the components in each of the above-described embodiments to operate such as to implement the functions of the embodiment is recorded on a recording medium, and the program recorded on the recording medium is read as codes and executed on a computer, is also included in the scope of each embodiment. In other words, a computer-readable recording medium is also included in the scope of each embodiment. Moreover, needless to mention the recording medium on which the above-described program is recorded, the program itself is also included in each embodiment.

For the recording medium, for example, a Floppy® disk, a hard disk, an optical disk, a magneto-optical disk, a CD-ROM, a magnetic tape, a nonvolatile memory card, or a ROM can be used. Moreover, the systems and the like are not limited to those that execute the processes based on the program alone recorded on the recording medium, but those that execute the processes by operating on an OS in cooperation with other software and functionality of an add-in board are also included in the scope of each embodiment.

Changes can be made to the present disclosure as appropriate within a scope that does not conflict with the gist or the principle of the invention that can be read from the claims and the specification in its entirety, and a parameter optimization system, a parameter optimization method, and a computer program with such changes are also incorporated within the technical idea of the present disclosure.

SUPPLEMENTARY NOTES

The above-described embodiments can also be further described as, but are not limited to, the following supplements.

Supplementary Note 1

A parameter optimization system described in Supplementary Note 1 is a parameter optimization system including: an image sensor having at least one sensing parameter; a parameter setting unit configured to be able to change the sensing parameter; a score calculation unit configured to calculate a score from an image acquired by the image sensor; and a parameter determination unit configured to determine a right parameter value that is a value of the sensing parameter at which the score is relatively high, based on a value of the sensing parameter and the score corresponding to the value of the sensing parameter.

Supplementary Note 2

A parameter optimization system described in Supplementary Note 2 is the parameter optimization system described in Supplementary Note 1, wherein the score calculation unit includes a neural network, and the sensing parameter is a parameter related to a setting value of an image pickup device.
score corresponding to the value of the sensing parameter.

Supplementary Note 3

A parameter optimization system described in Supplementary Note 3 is the parameter optimization system described in Supplementary Note 1 or 2, further comprising an information storage unit configured to store, as pair information, the value of the sensing parameter and the score corresponding to the value of the sensing parameter in association with each other, wherein the parameter determination unit is configured to determine the right parameter value, based on the pair information stored in the information storage unit.

Supplementary Note 4

A parameter optimization system described in Supplementary Note 4 is the parameter optimization system described in any one of Supplementary Notes 1 to 3, wherein the score calculation unit is configured to calculate the score from each of a plurality of images sequentially acquired, the parameter determination unit is configured to determine the right parameter value, based on a gradient of the sensing parameter that is calculated from a difference between the scores for the plurality of images and a difference between values of the sensing parameter, and the parameter setting unit is configured to change the sensing parameter such that the sensing parameter has the right parameter value newly determined.

Supplementary Note 5

A parameter optimization system described in Supplementary Note 5 is the parameter optimization system described in Supplementary Note 4, further comprising a noise calculation unit configured to calculate an amount of noise included in the score, wherein the parameter determination unit is configured not to newly determine the right parameter value when the difference between the scores is smaller than the amount of noise, and to newly determine the right parameter value when the difference between the scores is larger than the amount of noise.

Supplementary Note 6

A parameter optimization system described in Supplementary Note 6 is the parameter optimization system described in any one of Supplementary Notes 1 to 5, wherein the score is related to an image-pickup target included in the image, and the parameter setting unit is configured to change the sensing parameter such that the image-pickup target can be detected from the image when the score is a value corresponding to a state in which the image-pickup target is not detected.

Supplementary Note 7

A parameter optimization system described in Supplementary Note 7 is the parameter optimization system described in any one of Supplementary Notes 1 to 6, wherein the parameter determination unit is configured to determine a plurality of patterns of the right parameter values, according to different lighting environments around the image sensor.

Supplementary Note 8

A parameter optimization system described in Supplementary Note 8 is the parameter optimization system described in Supplementary Note 7, further comprising a presentation unit configured to present the plurality of patterns of the right parameter values to a user, wherein the parameter setting unit is configured to change the sensing parameter, according to a pattern selected by the user.

Supplementary Note 9

A parameter optimization method described in Supplementary Note 9 is a parameter optimization method in a parameter optimization system for an image sensor having at least one sensing parameter that can be changed, the parameter optimization method including: calculating a score from an image acquired by the image sensor; and determining a right parameter value that is a value of the sensing parameter at which the score is relatively high, based on a value of the sensing parameter and the score corresponding to the value of the sensing parameter.

Supplementary Note 10

A computer program described in Supplementary Note 10 is a computer program that allows a computer to: calculate a score from an image acquired by the image sensor; and determine a right parameter value that is a value of the sensing parameter at which the score is relatively high, based on a value of the sensing parameter and the score corresponding to the value of the sensing parameter.

Supplementary Note 11

A recording medium described in Supplementary Note 11 is a recording medium on which the computer program described in Supplementary Note 10 is recorded.

DESCRIPTION OF REFERENCE CODES

10 Parameter optimization system
11 Processor
14 Storage device
15 Input device
16 Output device
20 Camera
50 Image-pickup target
110 Image sensor
120 Parameter setting unit
125 Detection determination unit
130 Score calculation unit
135 Neural network
140 Parameter determination unit
145 Gradient calculation unit
150 Information storage unit
160 Score storage unit
170 Noise amount calculation unit
180 Parameter storage unit
190 Pattern presentation unit
200 Selection operation detection unit

What is claimed is:

1. A parameter optimization system comprising:
an image sensor having a sensing parameter;
at least one memory storing instructions; and
at least one processor configured to execute the instructions to:
calculate a score for image recognition from each of a plurality of images that are sequentially acquired by the image sensor;
calculate an amount of noise included in the score;
when a difference between the scores for the plurality of images is smaller than the amount of noise, and to newly determine the correct parameter value when the difference between the scores is larger than the amount of noise;
when a difference between the scores for the plurality of images is larger than the amount of noise, newly determine a correct parameter value, based on a gradient of the sensing parameter calculated from a difference between the scores for the plurality of images and a difference between values of the sensing parameter, based on a value of the sensing parameter and the score corresponding to the value of the sensing parameter;
change the sensing parameter such that the sensing parameter has the correct parameter value as newly determined; and
when the difference between the scores for the plurality of images is smaller than the amount of noise, do not newly determine the current parameter value.

2. The parameter optimization system according to claim 1, wherein
the at least one processor includes a neural network, and the sensing parameter is related to a setting value of an image pickup device.

3. The parameter optimization system according to claim 1, wherein
the at least one memory is configured to store, as pair information, the value of the sensing parameter and the score corresponding to the value of the sensing parameter in association with each other, and
the at least one processor is configured to execute the instructions to determine the correct parameter value, based on the pair information.

4. The parameter optimization system according to claim 1, wherein
the score for image recognition is related to an image-pickup target included in each image, and
the at least one processor is configured to execute the instructions to change the sensing parameter such that the image-pickup target can be detected from each image when the score is a value corresponding to a state in which the image-pickup target is not detected.

5. The parameter optimization system according to claim 1, wherein the at least one processor is configured to execute the instructions to determine a plurality of patterns of the correct parameter value, according to different lighting environments around the image sensor.

6. The parameter optimization system according to claim 5, wherein
the at least one processor is further configured to execute the instructions to present the plurality of patterns of the correct parameter value to a user, and
the at least one processor is configured to execute the instructions to change the sensing parameter, according to a pattern selected by the user.

7. A parameter optimization method performed by a parameter optimization system for an image sensor having a sensing parameter that can be changed, the parameter optimization method comprising:
calculating a score for image recognition from each of a plurality of images that are sequentially acquired by the image sensor;
when a difference between the scores for the plurality of images is larger than the amount of noise, newly determining a correct parameter value, based on a gradient of the sensing parameter calculated from a difference between the scores for the plurality of images and a difference between values of the sensing parameter, based on a value of the sensing parameter and the score corresponding to the value of the sensing parameter;
changing the sensing parameter such that the sensing parameter has the correct parameter value as newly determined; and
when the difference between the scores for the plurality of images is smaller than the amount of noise, not newly determining the current parameter value.

8. A non-transitory recording medium storing a computer program executable by a parameter optimization system for an image sensor having a sensing parameter that can be changed, to:
calculate a score for image recognition from each of a plurality of images that are sequentially acquired by the image sensor;
calculate an amount of noise included in the score;
when a difference between the scores for the plurality of images is smaller than the amount of noise, and to newly determine the correct parameter value when the difference between the scores is larger than the amount of noise;

when a difference between the scores for the plurality of images is larger than the amount of noise, newly determine a correct parameter value, based on a gradient of the sensing parameter calculated from a difference between the scores for the plurality of images and a difference between values of the sensing parameter, based on a value of the sensing parameter and the score corresponding to the value of the sensing parameter;

change the sensing parameter such that the sensing parameter has the correct parameter value as newly determined; and when the difference between the scores for the plurality of images is smaller than the amount of noise, do not newly determine the current parameter value.

* * * * *